(12) United States Patent
Nosker et al.

(10) Patent No.: US 11,760,640 B2
(45) Date of Patent: Sep. 19, 2023

(54) NANO-GRAPHITIC SPONGES AND METHODS FOR FABRICATING THE SAME

(71) Applicant: Rutgers, The State University of New Jersey, New Brunswick, NJ (US)

(72) Inventors: Thomas J. Nosker, Stockton, NJ (US); Bernard H. Kear, Whitehouse Station, NJ (US); Nofel Z. Whieb, Hilla Babylon (IQ); Jennifer K. Lynch-Branzoi, Franklin Park, NJ (US); Arya S. Tewatia, Piscataway, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 204 days.

(21) Appl. No.: 17/285,206

(22) PCT Filed: Oct. 15, 2019

(86) PCT No.: PCT/US2019/056274
§ 371 (c)(1),
(2) Date: Apr. 14, 2021

(87) PCT Pub. No.: WO2020/081531
PCT Pub. Date: Apr. 23, 2020

(65) Prior Publication Data
US 2021/0403326 A1 Dec. 30, 2021

Related U.S. Application Data

(60) Provisional application No. 62/745,839, filed on Oct. 15, 2018.

(51) Int. Cl.
*C01B 32/19* (2017.01)
*C01B 32/20* (2017.01)
(Continued)

(52) U.S. Cl.
CPC .............. *C01B 32/19* (2017.08); *B82Y 30/00* (2013.01); *C01B 32/20* (2017.08); *C08J 5/005* (2013.01);
(Continued)

(58) Field of Classification Search
CPC ......... C01B 32/19; C01B 32/20; B82Y 30/00; C08J 5/005; C08J 2377/04; H01M 10/052;
(Continued)

(56) References Cited

U.S. PATENT DOCUMENTS

| 5,298,214 A | 3/1994 | Morrow et al. |
| 5,789,477 A | 8/1998 | Nosker et al. |

(Continued)

FOREIGN PATENT DOCUMENTS

| CA | 2909715 A1 | 10/2014 |
| CA | 2888865 C | 5/2020 |

(Continued)

OTHER PUBLICATIONS

Alam, et al., In situ formation of a cellular graphene framework in thermoplastic composites leading to superior thermal conductivity, J. Mater. Chem. A 2017; 5: 6164-6169 (Year: 2017).*

(Continued)

*Primary Examiner* — Daniel C. McCracken
(74) *Attorney, Agent, or Firm* — FOX ROTHSCHILD LLP

(57) ABSTRACT

This disclosure provides a nano-graphitic sponge (NGS) and methods for preparing the nano-graphitic sponge. The disclosed nano-graphitic sponge possesses many excellent properties, including large surface areas and pore volumes, low-mass densities, good electrical conductivities and mechanical properties. These excellent properties make the nano-graphitic sponge an ideal material for many applica- (Continued)

tions, such as electrodes for batteries and supercapacitors, fuel cells and solar cells, catalysts and catalyst supports, and sensors.

10 Claims, 6 Drawing Sheets

(51) Int. Cl.
  *B82Y 30/00* (2011.01)
  *C08J 5/00* (2006.01)
  *H01M 10/052* (2010.01)
(52) U.S. Cl.
  CPC ....... *H01M 10/052* (2013.01); *C01P 2004/64* (2013.01); *C08J 2377/04* (2013.01)
(58) Field of Classification Search
  CPC ... H01M 4/622; H01M 4/133; C01P 2004/64; Y02E 60/10; Y02P 70/50
  See application file for complete search history.

(56) References Cited

U.S. PATENT DOCUMENTS

| | | | |
|---|---|---|---|
| 5,916,932 A | 6/1999 | Nosker et al. |
| 6,042,765 A | 3/2000 | Sugahara et al. |
| 6,962,431 B1 | 11/2005 | Luker |
| 7,465,605 B2 | 12/2008 | Raravikar et al. |
| 7,745,528 B2 | 6/2010 | Prud'Homme et al. |
| 7,906,053 B1 | 3/2011 | Torkelson et al. |
| 8,167,190 B1 | 5/2012 | Bullock et al. |
| 8,303,876 B1 | 11/2012 | Torkelson et al. |
| 8,734,696 B1 | 5/2014 | Torkelson et al. |
| 8,871,826 B2 | 10/2014 | Butzloff et al. |
| 9,139,440 B2 | 9/2015 | Felisar et al. |
| 9,597,657 B1 | 3/2017 | Zhamu et al. |
| 9,896,565 B2 | 2/2018 | Nosker et al. |
| 10,253,154 B2 | 4/2019 | Nosker et al. |
| 10,329,391 B2 | 6/2019 | Nosker et al. |
| 11,059,945 B2 | 7/2021 | Nosker et al. |
| 11,098,175 B2 | 8/2021 | Nosker et al. |
| 11,174,366 B2 | 11/2021 | Nosker et al. |
| 11,225,558 B2 | 1/2022 | Nosker et al. |
| 2005/0186378 A1 | 8/2005 | Bhatt |
| 2006/0047052 A1 | 3/2006 | Barrera et al. |
| 2006/0062986 A1 | 3/2006 | Magario et al. |
| 2007/0099792 A1 | 5/2007 | Khabashesku et al. |
| 2008/0279756 A1 | 11/2008 | Zhamu et al. |
| 2009/0087661 A1 | 4/2009 | Eder |
| 2010/0124713 A1 | 5/2010 | Farrugia et al. |
| 2010/0147188 A1 | 6/2010 | Mamak et al. |
| 2010/0317790 A1 | 12/2010 | Jang et al. |
| 2011/0017955 A1 | 1/2011 | Zhamu et al. |
| 2011/0114189 A1 | 5/2011 | Crain et al. |
| 2011/0133134 A1 | 6/2011 | Varma et al. |
| 2011/0143058 A1 | 6/2011 | Nosker et al. |
| 2011/0186789 A1 | 8/2011 | Samulski et al. |
| 2011/0260116 A1 | 10/2011 | Plee et al. |
| 2012/0065299 A1 | 3/2012 | Lukehart et al. |
| 2012/0068124 A1 | 3/2012 | Dickinson et al. |
| 2012/0142832 A1 | 6/2012 | Varma et al. |
| 2012/0264836 A1 | 10/2012 | Felisar et al. |
| 2012/0328946 A1 | 12/2012 | Bosnyak et al. |
| 2013/0018204 A1 | 1/2013 | Jeon et al. |
| 2013/0072613 A1 | 3/2013 | Miltner et al. |
| 2013/0295367 A1 | 11/2013 | Compton et al. |
| 2014/0042390 A1* | 2/2014 | Gruner ................... H01G 11/24 257/14 |
| 2014/0058046 A1 | 2/2014 | Sawa et al. |
| 2014/0083752 A1 | 3/2014 | Walczak et al. |
| 2014/0094541 A1 | 4/2014 | Shah et al. |
| 2014/0141257 A1 | 5/2014 | Ranade et al. |
| 2014/0183415 A1 | 7/2014 | Song |
| 2015/0267030 A1* | 9/2015 | Nosker ................... C08J 5/005 524/496 |
| 2016/0009561 A1 | 1/2016 | Coleman et al. |
| 2016/0332136 A1 | 11/2016 | Zhang et al. |
| 2017/0182474 A1* | 6/2017 | Zhamu ..................... B01J 20/20 |
| 2017/0207000 A1 | 7/2017 | Prestayko et al. |
| 2017/0218141 A1 | 8/2017 | Nosker et al. |
| 2017/0352868 A1 | 12/2017 | Zhamu et al. |
| 2019/0062521 A1 | 2/2019 | Nosker et al. |
| 2020/0362137 A1 | 11/2020 | Nosker et al. |
| 2021/0163747 A1 | 6/2021 | So et al. |

FOREIGN PATENT DOCUMENTS

| | | |
|---|---|---|
| CN | 101558455 A | 10/2009 |
| CN | 101817516 A | 9/2010 |
| CN | 103842422 A | 6/2014 |
| CN | 104884243 A | 9/2015 |
| CN | 104945659 A | 9/2015 |
| CN | 104945694 A | 9/2015 |
| CN | 105324241 A | 2/2016 |
| CN | 107074552 A | 8/2017 |
| CN | 107400246 A | 11/2017 |
| EP | 2287244 A1 | 2/2011 |
| EP | 2612889 A1 | 7/2013 |
| EP | 2905256 A1 | 8/2015 |
| JP | H08-053571 A | 2/1996 |
| JP | 2003-138145 A | 5/2003 |
| JP | 2003-531802 A | 10/2003 |
| JP | 2007-524735 A | 8/2007 |
| JP | 2008-266577 A | 11/2008 |
| JP | 2009-542839 A | 12/2009 |
| JP | 2011-038078 A | 2/2011 |
| JP | 2011-513167 A | 4/2011 |
| JP | 2012500179 A | 1/2012 |
| JP | 2012-136712 A | 7/2012 |
| JP | 2013018825 A | 1/2013 |
| JP | 2013-507477 A | 3/2013 |
| JP | 2013-233790 A | 11/2013 |
| JP | 2015537075 A | 12/2015 |
| JP | 2016-509122 A | 3/2016 |
| JP | 2016-519191 | 6/2016 |
| JP | 2017531052 A | 10/2017 |
| JP | 6393743 B2 | 9/2018 |
| JP | 2018138667 A | 9/2018 |
| JP | 2018-158453 A | 10/2018 |
| JP | 2019002021 A | 1/2019 |
| JP | 6633703 B2 | 1/2020 |
| KR | 10-2011-0018024 A | 2/2011 |
| KR | 10-2012-0009978 A | 2/2012 |
| TW | 201315763 A | 4/2013 |
| TW | 201915053 A | 4/2019 |
| WO | 2007145918 A2 | 12/2007 |
| WO | 2009018204 A1 | 2/2009 |
| WO | 2009029984 A1 | 3/2009 |
| WO | 2010107763 | 9/2010 |
| WO | 2010115173 A1 | 10/2010 |
| WO | 2011/042800 A1 | 4/2011 |
| WO | 2011/055198 A1 | 5/2011 |
| WO | 2012/133303 | 1/2012 |
| WO | 2012013303 A1 | 2/2012 |
| WO | 2012020099 A1 | 2/2012 |
| WO | 2012/049121 | 4/2012 |
| WO | 2013013070 A2 | 1/2013 |
| WO | 2013/058181 A1 | 4/2013 |
| WO | 2013/146213 A1 | 10/2013 |
| WO | 2014/062226 A1 | 4/2014 |
| WO | 20140172619 A1 | 10/2014 |
| WO | 2015044478 | 4/2015 |
| WO | 2015112088 A2 | 7/2015 |
| WO | 2016018995 A1 | 2/2016 |
| WO | 2016106312 A2 | 6/2016 |

OTHER PUBLICATIONS

Woltornist, et al., Polymer/Pristine Graphene Based Composites: From Emulsions to Strong, Electrically Conducting Foams, Macromolecules 2015; 48: 687-693 with Supporting Information (Year: 2015).*

(56) References Cited

OTHER PUBLICATIONS

Lu, et al.: "Preparation of Polyethylene/Expanded Graphite Intercalated Composites by In-situ Expanding Method", China Plastics, Jul. 31, 2009, vol. 23, No. 7, pp. 49-54.
Wakabayashi, et al.: "Polymer-Graphite Nanocomposites: Effective Dispersion and Major Property Enhancement via Solid-State Shear Pulverization", Macromolecules, American Chemical Society, Feb. 29, 2008, vol. 41, No. 6, pp. 1905-1908, XP-002743181.
Bao, et al.: "Preparation of Graphene by Pressurized Oxidation and Multiplex Reduction and its Polymer Nanocomposites by Masterbatch-Based Melt Blending", Journal of Materials Chemistry, Jan. 1, 2012, vol. 22, No. 13, pp. 6088-6096.
Randcastle Extrusion Systems, Inc., Nov. 1, 2006, XP055279030, retrieved from the Internet: URL: http://www.feedscrewdesigns.com/ubb/Forum1/HTML/000521.html [retrieved on Jun. 9, 2016], pp. 1-3.
Eda, et al: Chemically Derived Graphene Oxide: Towards Large-Area Thin-Film Electronics and Optoelectronics: Advanced Materials, 2010, vol. 22, pp. 2392-2415.
Novoselov, et al., "Electric Field Effect in Atomically Thin Carbon Films," Science, 2004; 306:666-669.
Jordhamo, et al: "Phase Continuity and Inversion in Polymer Blends and Simultaneous Interpenetrating Networks", Polymer Engineering and Science, vol. 26, No. 8, Apr. 1986, pp. 517-524.
Choudhary, et al: "Polymer/Carbon Nanotube Nanocomposites", Aug. 17, 2011, Chapter 4, pp. 65-90, Retrieved from the Internet: <http://www.intechopen.com/books/carbon-nanotubes-polymer-nanocomposites/polymer-carbon-nanotube-nanocomposites>.
Nixon, A.: "Understanding Graphene-Part 1", Feb. 4, 2016. [retrieved Nov. 18, 2016], Retrieved from the Internet: <http://investorintel.com/technology-metals-intel/understanding-graphene-part-1-graphene-and-graphite/>.
Thomas Swan; "Elicarb Graphene Epoxy Dispersion", Advanced Materials, Publication [unknown].
Xie, et al. "Boron Nitride Nanosheets As New Barrier Additive For Plastic Packaging", New/Nano Materials. Retrieved from the Internet <URL: https://www.tcd.ie./Physics/research/groups/1d-nanostructures/files/posters/NewNano%20-%2034_poster_Shaobo%20Xie.pdf>, Publication [unknown, no earlier than 2013].
Jonathan N. Coleman: "Liquid Exfoliation of Defect-Free Graphene", Accounts of Chemical Research, 2013, vol. 46, No. 1, pp. 14-22.
Paton, et al: "Scale-up of Liquid Exfoliation of Graphene", Thomas Swan Advanced Materials, Retrieved from the Internet: URL: https://www.tcd.ie/Physics/research/groups/1d-nanostructures/files/posters/ChemOnTubes%20Poster%20KP.pdf>. Publication [unknown, not earlier than 2014].
Paton, et al: "Scalable Production of Large Quantities of Defect-Free Few-Layer Graphene by Shear Exfoliation in Liquids", Nature Materials, Jun. 2014, vol. 13, pp. 624-630.
Dez-Pascual, et al: "High-Performance Nanocomposites Based on Polyetherketones", Progress In Materials Science, Pergamon Press, GB, vol. 57, No. 7, Mar. 4, 2012 (Mar. 4, 2012), pp. 1106-1190, XP028514432, ISSN: 0079-6425, DOI: 10.1016/J.PMATSCI.2012.03.003 [retrieved on Mar. 29, 2012].
Rangari, et al: "Alignment of Carbon Nanotubes and Reinforcing Effects in Nylon-6 Polymer Composite Fibers", Nanotechnology Instititute of Physics Publishing, GB, vol. 19, No. 24, Jun. 18, 2008 (Jun. 18, 2008), pp. 1-9, XP002679937, ISSN: 0957-4484, DOI: DOI:10.1088/0957-4484/19/24/245703 [retrieved on May 12, 2008].
Peeterbroeck, et al: "How Carbon Nanotube Crushing Can Improve Flame Retardant Behaviour in Polymer Nanocomposites?", Macromolecular Rapid Communications, vol. 28, No. 3, Feb. 2, 2007 (Feb. 2, 2007), pp. 260-264, XP055669652, DE, ISSN: 1022-1336, DOI: 10.1002/marc.200600614.
Tewatia, et al: "High Shear Melt-Processing of Polyetherethereketone Enhanced Polysulfone Immiscible Polymer Blends", Antec Orlando, The Plastics Technology Conference, Orange County Convention Center, Orlando, FL, May 7-10, 2018.
Tewatia, et al: "Multi-Scale Carbon (Micro/Nano) Fiber Reinforcement of Polyetheretherketone Using High Shear Melt-Processing", Fibers, 2017, 5, 32; doi:10.3390/fib5030032, pp. 1-11.
Lynch, et al: Applying Almmiscible Polymer Blend Concepts to Achieve an Amplified Orientation and Property Effect on Multiscale Reinforced Compositions, Sep. 2012.
Luker, K., "Summary Results of a Novel Single Screw Compounder", SPE-ANTEC Technical Papers, 2007, pp. 159-463.
Luker, K., "Randcastle Extrusion Systems, Inc—Microtruder Brochure", III, 2008.
Lynch, et al: "Development of Novel One-Step Hybrid Processing", SPE-ANTEC Technical Papers, 2010, pp. 2076-2080.
Whieb, Nofel Z: "Processing, Characteristics and Properties of NT-Enhanced PA 66", Published May 2, 2018, A dissertation submitted to the Graduate School-New Brunswick, Rutgers, The State University of New Jersey, Oct. 2017.
Paton, et al: Scalable Production of Large Quantities of Defect-Free, Few-Layer Graphene by Shear Exfoliation in Liquids, Nature Mater, 13, Apr. 20, 2014 (Apr. 20, 2014) retrieved via the internet on Dec. 9, 2019 (Dec. 9, 2019) <url:https://www.nature.com/articles/nmat3944> Abstract.
Dooher, et al: "Novel thermoplastic yarn for the through-thickness reinforcement of fibre-reinforced polymer composites", Journal of Thermoplastic Composite Materials, 2018, vol. 31(12), pp. 1619-1633.
Liu et al: "A Controllable Self-Assembly Method for Large-Scale Synthesis of Graphene Sponges and Free-Standing Graphene Films", Advanced Functional Materials, 2010, 20, 1930-1936, DOI: 10.1002/adfm.201000287 (XP-001554543).
"BASF Polystyrol 158 K Polystyrene (Global)", MatWeb Material Property Data, Retrieved from Internet: <https//www.matweb.com/search/datasheet.aspx?matguide-b011e2c0a7974492a5e0ed73c08a3454>.
Sathyanarayana et al: "Compounding of MWCNTs with PS in a Twin-Screw Extruder with Varying Process ParamATHYANARAYANA eters: Morphology, Interfacial Behavior, Thermal Stability, Rheology, and Volume Resistivity", Macromolecular Materials and Engineering, 2013, 298, 89-105.
Takase et al: :Dispersion of Carbon-Nanotubes in a Polymer Matrix by a Win-Screw Extruder.

* cited by examiner

Nano-Graphitic Sponge (NGS) with Open Cell Structure

A

B

A  NGS Block

B  NGS Thread

C  NGS Thread Roll

D  NGS Sheet/Film

E  NGS Sheet/Film Roll

F  NGS Spiral Wounded Tube with Hollow Center

Spiral Sheet/Film Wounded around Metal Wire

A

Metal Wire

Spiral Sheet/Film Wounded around Metal Wire and with Insulation Coating

B

Insulation Coating  Metal Wire

Cross-Sectional View of Metal-Impregnated Sponge Wire

C

Insulation Layer  Metal Coating  Metal-Filled Sponge Wire

NANO-GRAPHITIC SPONGES AND METHODS FOR FABRICATING THE SAME

CROSS-REFERENCE TO RELATED APPLICATIONS

This application is the U.S. National Phase of International Patent Application Serial No. PCT/US19/56274, filed Oct. 15, 2019, which claims priority under 35 U.S.C. § 119(e) to U.S. Provisional Patent Application Ser. No. 62/745,839, filed on Oct. 15, 2018. The entire disclosures of the applications noted above are incorporated by reference in its entirety.

FIELD OF THE INVENTION

This disclosure relates to nano-graphitic sponges (NGSs) and methods for fabricating the nano-graphitic sponges from a graphene-reinforced polymer matrix (G-PMC).

BACKGROUND OF THE INVENTION

Graphene, a two-dimensional (2D) monolayer of carbon atoms, has attracted much attention due to its fascinating properties such as high electrical conductivity, high thermal conductivity, extraordinary elasticity, and stiffness, etc. Graphene-based polymer composites with high electrical and thermal conductivity are highly desirable in many practical applications such as electronic devices, electromagnetic shielding, and thermal management.

However, the application of graphene-based polymer composites is limited by: (1) poor dispersion of graphene in a polymeric matrix due to their high specific surface area and strong intermolecular interactions between graphene sheets; and (2) at low filler content, graphene sheets are covered by polymer chains, preventing the graphene sheets from reaching a percolation limit in the composite. A good dispersion of graphene sheets and high filler content are required to form a conductive interconnected network in the polymer matrix to improve the conductivity of the composites, because the electrical and thermal conductivity of these composites is strongly dependent on electron and phonon percolation between the separated filler particles.

To achieve better dispersion of graphene in a polymer matrix, the strategy such as molecular functionalization has been investigated. However, the molecular functionalization, while improving dispersion, damages the electronic conjugation of graphene sheets and thus compromises the conductivity of the composite. Despite the improved homogeneous distribution, the electrical conductivity of these composites is still far below the expected level. Furthermore, a high loading of fillers generally hampers the processability and overall properties of the composites due to severe agglomeration and poor interfacial bonding.

The construction of a 3D, compactly interconnected graphene network (e.g., nano-graphitic sponge (NGS)) can offer a significant increase in electrical and thermal conductivity of polymer composites. Some methods for fabricating NGS, such as self-assembly strategies including one-step hydrothermal method, chemical reduction-induced method, and metal ion induced process, have been proposed. However, the re-stacking and aggregation of graphene sheets during assembly remains a serious problem. Thus, fabricating an NGS with a desirable graphene 3D network remains a challenge.

Accordingly, there exists a pressing need for a facile, low-cost, and scalable method to fabricate the nano-graphitic sponge (NGS).

SUMMARY OF THE INVENTION

This disclosure provides a novel nano-graphitic sponge (NGS) and methods for fabricating the NGS. The NGS may include particles selected from the group consisting of graphite microparticles, single-layer graphene nanoparticles, multi-layer graphene nanoparticles, and combinations of two or more thereof. The particles may include mechanically exfoliated single- and/or multi-layer graphene nanoparticles. In some embodiments, the single- and/or multi-layer graphene nanoparticles are less than 50 nm thick along the c-axis direction. In some embodiments, the particles may account for at least 50% of total sponge weight. In some embodiments, the NGS further includes carbon particles. In some embodiments, the NGS further includes a thermoplastic polymer.

The NGS as disclosed herein may have an open cell structure including a plurality of open cells. The open cells may have various shapes, sizes, and dimensions. In some embodiments, the mean pore size of the open cells ranges from about 1 nm to about 5 mm. The open cells may include an additional element encapsulated within the open cells. Examples of the additional elements may include Li, S, Si, Na and a combination of two or more thereof. The NGS may include other salts (e.g., metal salts), such as Li-salt (e.g., $LiCoO_2$, $LiMn_2O_4$, $LiFePO_4$, $LiOH$, $Li_2CO_3$, $LiCl$, $Li_2SO_4$, $HCOOLi$, $CH_3COOLi$, $Li_3(C_6H_5O_7)$, $(COOLi)_2$, $Li_2S$, $Li_2S_2$), etc.

The NGS may be fabricated into any shapes or forms, with various sizes/dimensions. In one example, the NGS can be formed into a block. In another example, the NGS can be formed into a thread. The thread may have a diameter ranging from about 1 μm to about 10 mm. The thread may be further fabricated into pellets with a length ranging from about 1 μm to about 10 mm. The thread may also be further fabricated into a powder form with a size ranging from about 0.1 μm to about 100 μm. The thread may be impregnated with a metal, thereby the metal is impregnated within the open cells and coated on the surface of the thread. In some embodiments, the thread may further include an insulating coating thereon to form a lightweight insulated electrically conductive wire.

Additionally, the NGS may be formed into a sheet/film. The sheet/film may have a thickness ranging from about 1 μm to about 10 mm. The sheet/film can be wounded into a hollow-center spiral tube. The hollow-center spiral tube may have a diameter ranging from about 10 μm to about 10 mm. In some embodiments, the spiral tube includes one or more layers of the sheet/film. The spiral tube may further include one or more layers of the sheet/film wounded around a metal wire in the center of the spiral tube. In some embodiments, the spiral tube may include an insulating coating thereon to form a lightweight insulated electrically conductive wire.

This disclosure also provides an electrode including a sponge structure fabricated from an NGS block, an NGS thread or an NGS sheet/film. The electrode can be an anode or a cathode and may further include an insulating film to separate the sponge structure from the adjacent sponge structure. Also contemplated in this disclosure is a rechargeable battery which includes an electrode as described and a transport liquid medium. The rechargeable battery may further include an insulating film to insulate the anode and the cathode, wherein the electrode is in a film shape and folded with the insulting film one or more times. The electrode and the insulating film may be wounded in a cylindrical shape or a flat pouch-like shape.

The NGS may include thermoplastic polymer chains intermolecularly crosslinked to said single- and multi-layer graphene nanoparticles through covalent bonding. In some embodiments, the single- and multi-layer graphene nanoparticles are doped with other elements to modify surface chemistry. For example, surface chemistry or nanostructure of the exfoliated single- and multi-layer graphene nanoparticles may be modified to enhance bond strength with the polymer matrix to increase strength and stiffness of the polymer matrix composite and the NGS.

The NGS may include the thermoplastic polymer molecules that are each covalently bonded to one or more said single- and/or multi-layer graphene nanoparticles. In some embodiments, the NGS may include at least one thermoplastic polymer molecule bonded or adhered to one or more mechanically exfoliated single- or multi-layer graphene nanoparticles.

The thermoplastic polymer may be selected from acrylics, polymethyl-methacrylate (PMMA), acrylonitrile, acrylonitrile butadiene styrene (ABS) co-polymers, polyacrylonitriles (PAN), aromatic polysulfones, aromatic thermoplastic polyesters, liquid crystal polymers, polyarylether-ketones, polycarbon-ates (PC), polyetherether-ketones (PEEK), polyetherimides (PEI), polyetherketones (PEK), polyethylene, polyethylene sulfide (PES), polyethylene terephthalate (PET or PETE), low-density polyethylene (LDPE), high-density polyethylene (HDPE), polyglycolic acid (PGA), polylactic acids (PLA), polylactic-glycolic acid copolymers (PLGA), polyoxymethylene plastic (POM/Acetal), polyphenylene ethers, polyphenylene oxide (PPO), polyphenylene sulfides (PPS), polypropylene (PP), polystyrene (PS), polysulfones (PSU), polytetrafluoro-ethylene (PTFE/TEFLONO), polyvinylchloride (PVC), polyvinylidene fluoride (PVDF), thermoplastic elastomers, thermosplastic polyimides, ultra-highmolecular-weight polyethylene (UHMWPE), Polyamides (PA), aliphatic polyamides, semi-aromatic polyamides, aromatic polyamides, polyamide-11 (nylon-11), polyamide-12 (nylon-12), polyamide-4,6, polyamide-6 (nylon-6), polyamide-6,10, polyamide-6,12, polyamide-6,6 (nylon-6,6), polyamide-6,9, polyamides (PA), and the mixtures of two or more thereof.

This disclosure also provides a product containing the above-described NGS, which may be a battery part, a supercapacitor part, a sensor part, a fuel cell part, a solar cell part, a catalyst, a catalyst support material or an absorbent. For example, the product may be an electrode (e.g., anode, cathode) of a battery or a capacitor. The product may be a rechargeable battery, which has a first electrode containing the NGS which is intercalable with an alkali metal, a counter electrode intercalable with the alkali metal, and an electrolyte which includes an organic solvent and a salt of the alkali metal in contact with the first electrode and the counter-electrode.

The present disclosure also provides a method for forming an NGS. The method includes (a) distributing graphite microparticles into a molten thermoplastic polymer phase; (b) applying a succession of shear strain events to the molten polymer phase so that the molten polymer phase exfoliates the graphite successively with each event until at least 1 wt %, optionally at least 5 wt %, optionally at least 10 wt %, optionally at least 20 wt %, optionally at least 50 wt %, optionally at least 75 wt %, optionally at least 95 wt % of the graphite is exfoliated to form a distribution in the molten polymer phase of single- and multi-layer graphene nanoparticles less than 50 nm thick along a c-axis direction, thereby forming a graphene-reinforced polymer matrix composite; and (c) heating the graphene-reinforced polymer matrix composite until the polymer degrades and gasifies to form an NGS. In some embodiments, the method further includes (d) vapor- or liquid-infiltrating a precursor containing the electro-active element into the NGS to form an electro-active element-intercalated NGS.

In some embodiments, the method further includes forming a uniform distribution of one or more additives in the molten polymer phase. The additives facilitate intercalation of the electro-active element into the NGS. In some embodiments, the graphite particles are incorporated into a polymer matrix using a single screw extruder with axial fluted extensional mixing elements or spiral fluted extensional mixing elements. In some embodiments, the graphite-containing polymer matrix is subjected to repeated extrusion to induce exfoliation of the graphite to form a uniform dispersion of graphene nanoparticles in the polymer matrix.

In some embodiments, the step of distributing the graphite includes distributing said graphite including the graphite microparticles into the molten thermoplastic polymer phase, wherein at least 10 wt %, optionally at least 20 wt %, optionally at least 30 wt %, optionally at least 40 wt %, optionally at least 50 wt % of the graphite consists of multilayer graphite crystals between 1.0 and 1000 microns thick along a c-axis direction. In some embodiments, the step of applying a succession of shear strain events includes applying a succession of shear strain events to said liquid thermoset polymer precursor phase so that the shear stress within the polymer precursor phase is equal to or greater than the Interlayer Shear Strength (ISS) of the graphite.

In some embodiments, the succession of shear strain events are applied until at least 90 wt % of said graphite is exfoliated to form a distribution in the molten polymer phase of said single- and multi-layer graphene nanoparticles less than 50 nm thick along the c-axis direction. In some embodiments, the succession of shear strain events are applied until at least 75 wt % of said graphite is exfoliated to for a distribution in the molten polymer phase of said single- and multi-layer graphene nanoparticles less than 50 nm thick along the c-axis direction. In some embodiments, the succession of shear strain events are applied until at least 10 wt %, optionally at least 20 wt %, optionally at least 30 wt % of said graphite is exfoliated to for a distribution in the molten polymer phase of said single- and multi-layer graphene nanoparticles less than 50 nm thick along the c-axis direction. In some embodiments, the succession of shear strain events are applied until at least 90 wt % of said graphite is exfoliated to for a distribution in the molten polymer phase of said single- and multi-layer graphene nanoparticles less than 10 nm thick along the c-axis direction. In some embodiments, the succession of shear strain events are applied until at least 75 wt % of said graphite is exfoliated to for a distribution in the molten polymer phase of said single- and multi-layer graphene nanoparticles less than 10 nm thick along the c-axis direction. In some embodiments, the succession of shear strain events are applied until at least 30 wt % of said graphite is exfoliated to for a distribution in the molten polymer phase of said single- and multi-layer graphene nanoparticles less than 10 nm thick along the c-axis direction.

In some embodiments, the graphene-reinforced polymer matrix composite contains between about 0.1 wt % and about 50 wt % of graphene. In some embodiments, the graphene-reinforced polymer matrix composite contains between about 1 wt % and about 30 wt % of graphene. In some embodiments, the graphene-reinforced polymer matrix composite contains between about 10 wt % and about 30 wt % of graphene.

In some embodiments, the enhanced polymer matrix composite includes thermoplastic polymer chains intermolecularly crosslinked to said single- and multi-layer graphene nanoparticles through covalent bonding. In some embodiments, the succession of shear strain events are applied until fractures of said single- and multi-layer graphene nanoparticles are formed across the basal plane of said single- and multi-layer graphene nanoparticles, wherein the edges of the fractures comprise reactive free radical bonding sites that react with said one or more molten thermoplastic polymers to provide a composite where thermoplastic polymer chains are directly covalently bonded to, and inter-molecularly cross-linked by said single- and multi-layer graphene nanoparticles.

In some embodiments, the graphite is doped with other elements to modify the surface chemistry of the exfoliated single- and multi-layer graphene nanoparticles. In some embodiments, surface chemistry or nanostructure of the exfoliated single- and multi-layer graphene nanoparticles is modified to enhance bond strength with the polymer matrix to increase strength and stiffness of the enhanced polymer matrix composite. In some embodiments, said single- and multi-layer graphene nanoparticles are directionally aligned thereby providing one-, two- or three-dimensional reinforcement of the polymer matrix.

The present disclosure also provides an NGS prepared according to the above-described methods. The present disclosure further provides a product including the NGS prepared according to the above-described methods. In some embodiments, the product may be an electrode of a battery or a capacitor. The electrode may be an anode or a cathode.

In some embodiments, the present disclosure further provides a rechargeable battery having a first electrode intercalable with an alkali metal, a counter electrode intercalable with the alkali metal, and an electrolyte comprising an organic solvent and a salt of the alkali metal in contact with the first electrode and the counter electrode. The first electrode and/or the counter electrode include the NGS prepared according to the above-described methods.

The foregoing and other objects, features, and advantages of the present disclosure set forth herein will be apparent from the following description of particular embodiments of those inventive concepts, as illustrated in the accompanying drawings. The drawings depict only typical embodiments of the present disclosure and, therefore, are not to be considered limiting in scope.

BRIEF DESCRIPTION OF THE DRAWINGS

FIG. 3B shows an example of an NGS wire with an insulation coating. FIG. 3C is a cross-sectional view of the NGS wire shown in FIG. 3B.

FIG. 4A shows a battery assembly including an insulating film separating an electrode formed of an NGS with a metal salt and a second electrode formed of an NGS with/without a sulfide salt. FIGS. 4B and 4C show an electrode assembly, as shown in FIG. 4A, including an anode and a cathode separated by an insulating film. The electrode assembly is formed into a brick shape (FIG. 4A) and a spiral shape (FIG. 4B).

DETAILED DESCRIPTION OF THE INVENTION

Figure 1A:
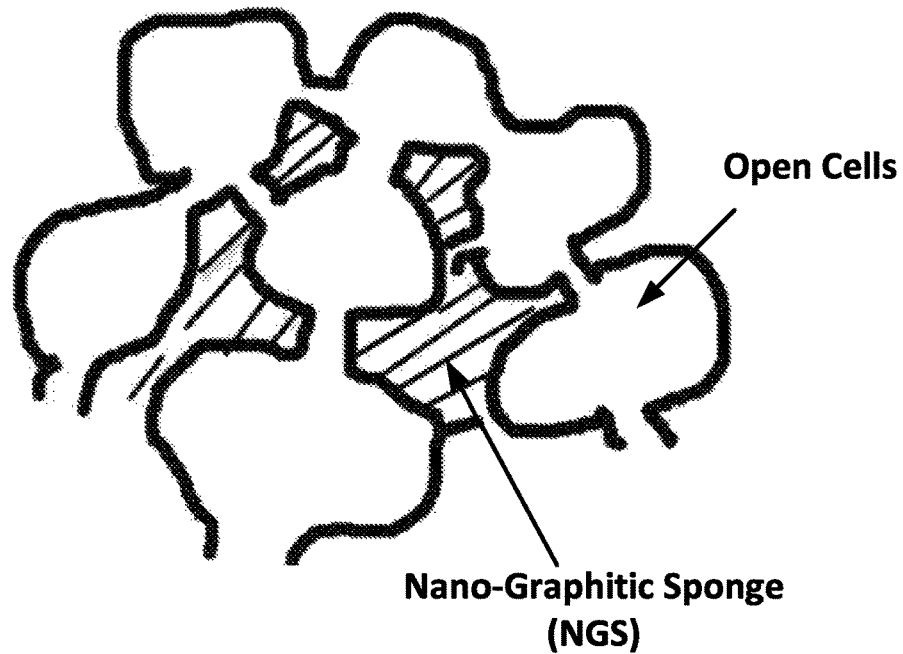
FIGS. 1A and 1B (collectively "FIG. 1") show an example of a nano-graphitic sponge (NGS) without metal salts with an open-cell porous structure (FIG. 1A) and with a metal salt (FIG. 1B).

Nano-graphitic sponge (NGS), a three-dimensional graphene structure, possess many excellent properties, including large surface areas and pore volumes, low densities, good electrical conductivities and mechanical properties. Given their excellent properties, NGS has great potential in a wide variety of applications, such as absorbents, catalysts, catalyst supports, sensors, electrodes (e.g., transparent conductive electrodes, battery electrodes, capacitor electrodes), energy storage and conversion, fuel cells, batteries, supercapacitors, solar cells, and biological applications. One aspect of the present disclosure is directed to a novel NGS and the applications thereof, and another aspect of the present disclosure is directed to methods for fabricating the NGS from a graphene-reinforced polymer matrix composite (G-PMC).

1. Nano-Graphitic Sponge (NGS)

The present disclosure provides a novel nano-graphitic sponge (NGS) comprising graphite microparticles and graphene nanoparticles. The graphite microparticles and graphene nanoparticles form a three-dimensionally (3D) interconnected, conductive, and open-cell porous network, as shown in FIG. A. Such an interconnected 3D porous network provides a large electrode specific surface area and high electron conductivity in the electrode assembly. The size of open cells may range from nanometer to millimeter (e.g., 1 nm to about 10 mm). The pore size and structure, as well as surface properties, are tunable by adding functional additives and/or by adjusting one or more synthesis conditions of the methods for fabricating the NGS, as described in the latter sections.

The graphite/graphene particles may account for 50 wt % to 100 wt % (e.g., 60 wt %, 70 wt %, 80 wt %, 90 wt %, 95 wt %, 99 wt %) of the total weight of the NGS. In some embodiments, from 5 wt % to 90 wt %, or from 10 wt % to 80 wt %, or from 10 wt % to 70 wt %, or from 10 wt % to 60 wt %, or from 10 wt % to 50 wt %, or from 10 wt % to 40 wt %, or from 10 wt % to 30 wt % of the graphite/graphene particles are graphene nanoparticles. Graphene nanoparticles may include graphene single-layer nanoparticles, few-layer nanoparticles, multi-layer nanoparticles, graphene flakes, and graphene platelets. Graphene nanoparticles may be in an essentially pure and uncontaminated form.

The graphite microparticles and graphene nanoparticles constituting an NGS may have different sizes. For one example, graphene nanoparticles may have a size from 10 to 1,000 nm (e.g., 100 nm, 50 nm, 20 nm, 10 nm) thick along the c-axis direction. In another example, at least 50 wt % (e.g., at least 60 wt %, at least 70 wt %, at least 80 wt %, at least 90 wt %, at least 95 wt %) of single- and multi-layer graphene nanoparticles are less than 50 nm (e.g., less than 40 nm, less than 30 nm, less than 20 nm, less than 10 nm) thick along a c-axis direction.

The NGS may further include a polymer. For example, the polymer may be a thermoplastic polymer remained from the NGS preparation process. In preparing NGS, a graphene-reinforced polymer matrix composite (G-PMC) may be subject to a thermal annealing process, which degrades and/or gasifies some or most of the thermoplastic polymer contained in G-PMC. The NGS may include a residual thermoplastic polymer and/or carbon particles. In some embodiments, after the thermoplastic polymer is gasified, it may leave behind carbon powder resulted from its degradation. The thermoplastic polymer, even at a residual amount, could be beneficial to the structure and function of the NGS. For example, the thermoplastic polymer may provide additional sites for functionalization in addition to those present on graphite/graphene particles. The thermoplastic polymer also helps to maintain the structural integrity of the NGS by providing additional support to buttress the interaction between graphite/graphene particles.

In some embodiments, the thermoplastic polymer may increase the strength of NGS by forming covalent bonds with graphene nanoparticles. As described in the latter sections, an NGS can be prepared from a graphene-reinforced polymer matrix composite (G-PMC). G-PMC is prepared by in situ exfoliating graphite into a molten thermoplastic polymer phase comprising one or more molten thermoplastic polymers. The exfoliation and distribution of graphite are carried out by applying to the molten polymer phase a succession of sheer events, so that the molten polymer phase exfoliates the graphene successively with each event until a lower level of graphene layer thickness is achieved. During this process, ripping and tearing of exfoliated multilayer graphene sheets occurs and produces reactive edges on the graphene sheets. Activated graphene is formed as the graphene fractures across the basal plane and offers potential sites for crosslinking to the matrix or attaching other chemically unstable groups for functionalization. The reactive edges of graphene fractures react with and crosslink the thermoplastic polymer. Therefore, cross-linking is performed under exclusion of oxygen, preferably under an inert atmosphere or a vacuum, so that the reactive edges do not oxidize or otherwise become unreactive. Forming covalent bonds between graphene and the polymer matrix significantly enhances the strength of NGS.

The NGS may be formed from a polymer composite that includes nano-size "thermoset-like" graphene/polymer clusters. Each newly exfoliated graphene sheet may form covalent bonds with one or more polymer chains. The polymer chains may, in turn, form additional covalent bonds with more newly exfoliated graphene. These graphene sheets may form more covalent bonds with additional polymers. This process can lead to nano-size clusters of covalent bonded graphene and polymers. These clusters have essentially similar bonding structure as a thermoset block of polymers, in which molecules are chemically bonded together. However, unlike graphene/polymer clusters, in a thermosetting reaction, all polymers will crosslink with each other and form a final large crosslinked block, resulting in a solid mass with a strong and rigid structure. After thermosetting, the polymers lose their thermoplastic properties. By contrast, graphene/polymer clusters are generally formed by a local level, rather than a global level of crosslinking, between graphene and polymers. Thus, only a portion of the polymers is "crosslinked" with graphene sheets. As opposed to thermosetting, the polymers are not chemically modified and retain their thermoplastic properties.

Depending on the extent of crosslinking between thermoplastic polymer and mechanically exfoliated graphene nanoparticles, the composite may contain one or more graphene/polymer clusters that intersperse within the polymer matrix. Each graphene/polymer cluster may vary in sizes and shapes. Those graphene/polymer clusters contribute the structural rigidity as well as thermoset properties to the newly formed composite. However, in contrast with a thermoset, the composite containing graphene/polymer clusters retains its thermoplastic property and can be re-melt and processed into other shapes and products, just like typical thermoplastic resins.

The polymer may be any one of acrylics, polymethylmethacrylate (PMMA), acrylonitrile, acrylonitrile butadiene styrene (ABS) co-polymers, polyacrylonitriles (PAN), aromatic polysulfones, aromatic thermoplastic polyesters, liquid crystal polymers, polyarylether-ketones, polycarbonates (PC), polyetherether-ketones (PEEK), polyetherimides (PEI), polyetherketones (PEK), polyethylene, polyethylene sulfide (PES), polyethylene terephthalate (PET or PETE), low-density polyethylene (LDPE), high-density polyethylene (HDPE), polyglycolic acid (PGA), polylactic acids (PLA), polylactic-glycolic acid copolymers (PLGA), polyoxymethylene plastic (POM/Acetal), polyphenylene ethers, polyphenylene oxide (PPO), polyphenylene sulfides (PPS), polypropylene (PP), polystyrene (PS), polysulfones (PSU), polytetrafluoro-ethylene (PTFE/TEFLONO), polyvinylchloride (PVC), polyvinylidene fluoride (PVDF), thermoplastic elastomers, thermosplastic polyimides, ultra-high-molecular-weight polyethylene (UHMWPE), Polyamides (PA), aliphatic polyamides, semi-aromatic polyamides, aromatic polyamides, polyamide-11 (nylon-11), polyamide-12 (nylon-12), polyamide-4,6, polyamide-6 (nylon-6), polyamide-6,10, polyamide-6,12, polyamide-6,6 (nylon-6,6), polyamide-6,9, polyamides (PA), and the mixtures of two or more thereof.

Figure 1B:
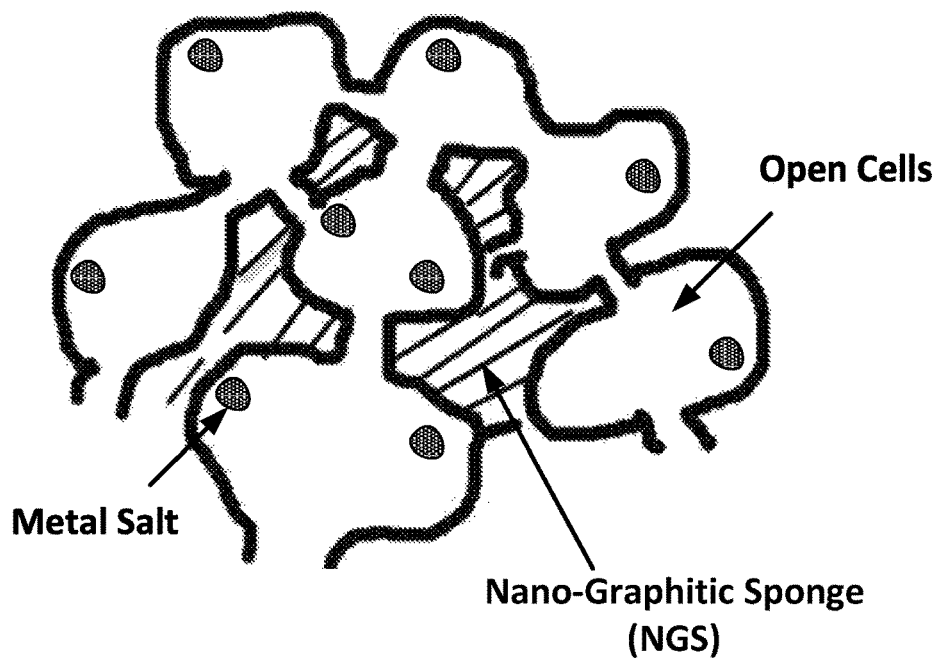

The NGS may include one or more additional elements, such as Li, S, Si, Na and a combination of two or more thereof. For example, the NGS may include one or more salts, such as, sodium salt, Li-salt (e.g., $LiCoO_2$, $LiMn_2O_4$, $LiFePO_4$, LiOH, $Li_2CO_3$, LiCl, $Li_2SO_4$, HCOOLi, $CH_3COOLi$, $Li_3(C_6H_5O_7)$, $(COOLi)_2$, $Li_2S$, $Li_2S_2$), etc. (FIG. 1B). The salts may be encapsulated within the open cells or intercalated between graphene layers. A salt-containing NGS can be made from G-PMC containing metal salts in the composite. The salt-containing G-PMC is passed through the heat chamber to soften and liquefy the resin. Optionally, after most of the resin is removed, it goes through an additional higher temperature treatment to decompose the plastic resin. The resulting NGS contains an open cell structure with a plurality of open cells. The cell walls consist of primary graphene, graphite, carbon particles and/or residual plastic resin. The metal salts are encapsulated within the cells surrounded by the graphene/graphite walls.

Figure 2A:
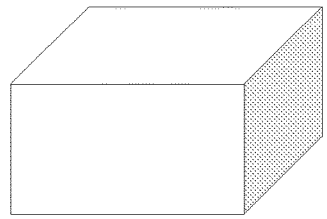
FIGS. 2A, 2B, 2C, 2D, 2E, and 2F (collectively "FIG. 2") show examples of NGS formed in different shapes.
Figure 2B:
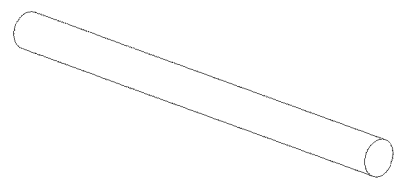

Due to the unique methods for preparing the NGS, as presented in the latter sections, the NGS can be produced in various forms/shapes by molding the G-PMC into any custom-designed size and shape. Accordingly, the NGS may have various shapes (e.g., square, round, triangle), sizes (e.g., centimeter, millimeter, micrometer, nanometer), or forms (e.g., rod, block, sheet, film, thread, powder), as shown in FIG. 2. For example, the NGS may be formed into an NGS thread (FIG. 2B). In a thermal annealing process, the NGS threads can be formed by passing G-PMC threads through a heating chamber to soften, liquefy, and/or gasify, such that most of the plastic resin is removed. Optionally and/or additionally, the G-PMC thread may undergo additional heat treatments to decompose/degrade the rest of the plastic resin. During this thermal process, the plastic resin is initially softened and liquefied then extracted out of the G-PMC, leaving an open-cell sponge behind. Because the plastic resin is an insulator to the electricity, the less the plastic resin left in the sponge, the better the electric conductivity for the sponge. Thus, the G-PMC sponge may further undergo a higher temperature treatment to essentially decompose majority of the plastic resin to further reduce the amount of the plastic resin in the sponge. Carbon particles resulted from decomposed resin are left in the sponge. The graphene and residual plastic resin give the strength of the sponge and provide the integrity of the structure. The amount of remaining plastic resin can be controlled by the heat treatment process, for example, by adjusting the graphite/plastic resin ratio.

The size of the open cell can be as small as a nano-size cell and as big as a 10 mm size cell. The presence of the nano-size cells increases the surface area of the sponge. The size of the open cells is tunable by adjusting one or more conditions for preparing an NGS, for example, the initial mixing ratio of resin/graphite. The higher the resin/graphite ratio, the bigger the size of the open cells. This is because in the graphene-polymer matrix having a higher resin/graphite ratio, the graphite/graphene particles are more sparsely distributed, which results in a bigger size of the open cells of NGS. The ability to tailor the size of open-cells of NGS is especially advantageous, since NGS can be customized for different applications. For example, a larger size of open cells is beneficial when the NGS needs to be functionalized or intercalated with other elements, such as lithium, sulfur, sodium salts. One the other hand, the smaller the size of the open cells is, the larger surface area the NGS has. NGS with a large surface area is a better electrical conductor. Also, large surface areas of NGS are beneficial when NGS is used as an absorbent for gas or liquid. For example, the NGS with a large surface area can be used to remove organic pollutants or oil spills from water.

Figure 2C:

The NGS thread may have a diameter ranging from about 1 μm to about 10 mm. The thread may further form into other three-dimensional configurations (FIG. 2). For example, multiple NGS threads can be bundled or woven together to form a bigger NGS bundle (FIG. 2C). The NGS bundle can be twisted together to form a sponge rope that can be stronger against accidental breakage. The NGS thread/bundle/rope can be coated with insulation or protective coatings, such as plastic coating, for insulating electricity, easy shipping and handling. They can be used as wires/cable to transmit electricity, because graphite is an electrically conductive material and graphene has higher electric conductivity than copper. This is also because, in a sponge structure, both graphite and graphene form the cell wall and provide the contacting surfaces for electric conductivity. The nano-size cells will increase the surface area in the walls, hence increasing the electric conductivity and thus improving the battery charging speed. Graphene is also known as a mechanically strong material (over 200 times stronger than steel). The NGS wire/cable has excellent electric conductivity, while having lower mass density than a metal wire/cable (e.g., copper/aluminum wire/cable). Importantly, as described in the later sections, the strength and the electric conductivity of the NGS can also be customized, for example, by controlling the degree of exfoliation of graphite into graphene.

NGS can also be produced into fine powder grade. The power form may have a size ranging from about 0.1 μm to about 100 μm. The powder form of NGS may be prepared by extruding fine NGS threads. The NGS threads may be segmented into small pellets first. The pellets may have a length ranging from about 1 μm to about 10 mm. The NGS pellets may undergo a grinding process to obtain fine powder form of NGS. The powder size can be controlled by the degree of grinding. The ground NGS power can be further separated in an air chamber to isolate the superfine particles from the bulk. This process allows the minimum size of the powder to be controlled. It also makes easier for the air filtration system to remove any airborne particles and prevents the inhalation of superfine powders by workers. Also, the NGS powder comprising graphene/graphite/carbon powder/residual resin can be used as a replacement of pre-exfoliated graphene powder. It is cheaper and eliminates potential health hazards due to inhalation of pre-exfoliated graphene powder.

The powder form of NGS can be used for generating a slurry/solution by mixing the NGS power with a liquid carrier. The slurry/solution can be used to modify the surface property of a substrate. For example, the slurry/solution can be printed onto the surface of the substrate. Due to the electrical and thermal conductivity of the NGS, the substrate with the printed NGS on the surface can be used in a vehicle to eliminate static charge, electric heating surface, and for other power conducting applications. For example, the slurry/solution, along with a lithium salt, can also be used to coat aluminum foil to form an anode in a battery.

The graphene sponge powder consists of a high degree of exfoliated graphene with residual graphite, residual plastic resin and/or carbon powder. It can be used as a low-cost alternative to pre-exfoliated graphene. The graphene sponge powder can be mixed in paint to provide better corrosion resistance. It can be mixed in a carrier to coat lithium salt for use as an anode in the rechargeable batteries. It can also be coated on a flat panel to be used as a heating board as a heater for house and clothing.

The disclosed NGS can be integrated with metal to form an NGS/metal hybrid material (FIG. 3). For example, the above described NGS wire/cable may be a metal/NGS hybrid wire/cable. Such an NGS/metal hybrid wire/cable exhibits not only decreased resistivity, but also increased elasticity and current tolerance. Moreover, the NGS/metal hybrid wire/cable has a lower mass density than copper wire/cable. The metal may include any metal suitable for use as a medium for transmitting electrical current, such as aluminum, copper, gold, platinum, silver, iron, etc. The metal may also include a metal alloy, e.g., an alloy of aluminum, copper, gold, platinum, silver, iron, etc. Similarly, the NGS film can also be integrated with metal to form an NGS/metal hybrid film. As with the NGS/metal hybrid wire/cable, such NGS/metal hybrid film exhibits both high electrical conductivity and high elasticity. With these advantages, the NGS/metal hybrid film can be fabricated with reduced thickness, for example, between about 1 μm and about 10 mm.

Previous attempts to mix pre-exfoliated graphene in metal, such as aluminum, to create a lightweight electrical wire with high conductivity have encountered several difficulties. First, the existing methods, similar to mixing pre-exfoliated graphene in the plastic resin, can only load very limited amount of graphene into the metal. Second, the distribution of graphene in the metal is difficult to be controlled, thus leaving many regions of the mixture with little or no graphene. Third, the incompatibility between graphene and metal makes it more difficult to distribute graphene in the metal.

The sponge thread as described herein presents a solution to this problem. It has a high concentration of graphene and well connected to each other in the sponge, and graphene higher capacity in carrying the electricity than copper. The graphene sponge thread is further strengthened by the metal, such as aluminum, and thus it is strong and not susceptible to mechanical force. Together, the metal-enhanced NGS wire provides better electrical conductivity, better durability and strength, and lower weight density than typical metal wires.

Figure 3A:
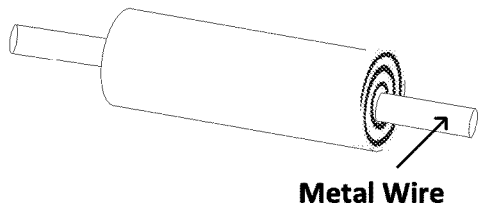
FIGS. 3A, 3B, and 3C (collectively "FIG. 3") show examples of an NGS wire formed by wounding spiral sheet/film around a metal wire (FIG. 3A).
Figure 3B:
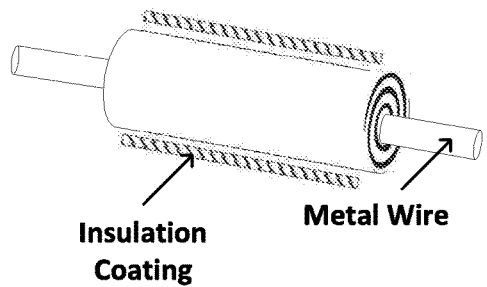
Figure 3C:
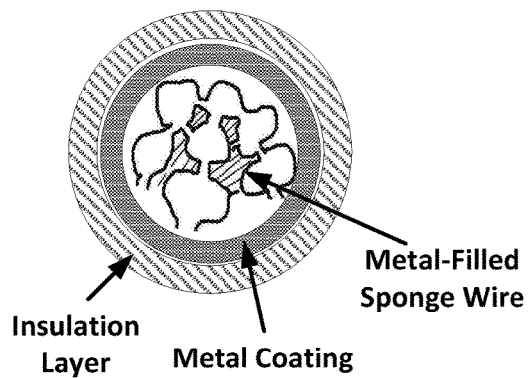

It is therefore advantageous to use the NGS as a starting material to prepare NGS/metal hybrid materials. Because the NGS, such as the NGS thread, has hollow open cells. It can be soaked in a molten metal tank to impregnate the sponge with the metal. The sponge thread is then pulled through a hole. The diameter of the hole is slightly larger than the thread diameter and controls the diameter of the metal-coated sponge thread. The metal can be aluminum, alloy or other low melting point metal. The metal reinforces the sponge thread and enhances the electric conductivity. The thicker the outer metal layer, the stronger the sponge thread is. The electricity can pass through the graphene and graphite in the sponge thread and the impregnated metal. The metal-impregnated NGS thread may be additionally coated with an insulating outer coating, such that the NGS thread to be used as an electrical wire (FIGS. 3B and 3C). The resulting NGS wire has lighter weight compared to the copper wire.

Figure 2D:
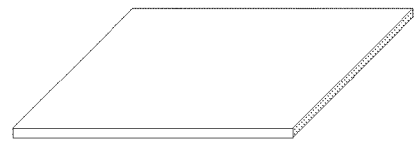

NGS may also be formed into a thin sheet/film form (FIG. 2D) by extruding G-PMC into a sheet, which can be further stretched into a thinner sheet or even into a film. It can also be made by extrusion blow molding (EBM) into a thin film. The thin sheet/film can then be treated in a heat chamber to evacuate the plastic resin from the sheet/film, resulting in an open-cell NGS sheet/film. The thickness of sheet or film may range from 0.001 mm to 10 mm (FIG. 2D). The thinner gauge the sheet/film is, the easier to remove the resin from the sponge. The NGS sheet/film may include graphene/graphite particles, with or without residual plastic resin. In some embodiments, The NGS sheet/film may further include carbon particles resulted from the degradation of the thermoplastic polymer during the thermal process. Compared to other forms of NGS, it is easier and faster to remove the plastic resin from a thin sheet/film.

As described above, the salt-containing NGS sheet/film may be produced from a salt-containing G-PMC after the resin is evacuated from the composite. The resulting NGS sheet/film may contain graphene/graphite/residual resin/metal salt or graphene/graphite/residual resin/carbon particles/metal salt. The size of open cells can be adjusted by altering the initial resin/graphite ratio. The higher the resin/graphite ratio, the bigger the cell size. The metal salts are encapsulated in cells and surrounded by cell walls constituted with graphene/graphite/carbon particles/residual resin.

Figure 2E:
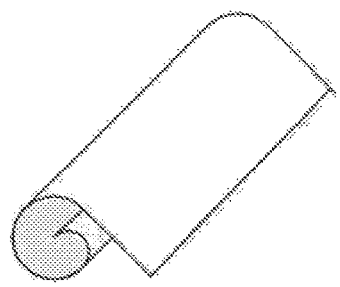
Figure 2F:
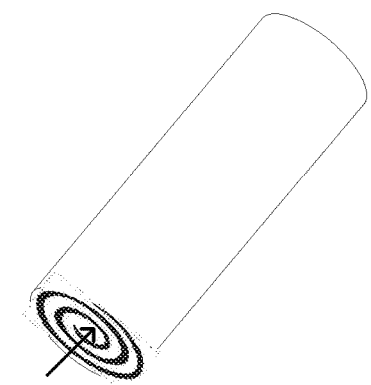

The NGS sheet/film can be rolled up into a continuous roll (FIG. 2E). The sponge sheet/film can be spirally wounded into a continuous tube with a hollow center with a diameter from 0.01 mm to 10 mm (FIG. 2F). The sponge spiral wounded tube can be made with single-layer sheet/film or multi-layer sheet/film. The tube structure provides better resistance to bent/tear/damage to the sheet/film and protects the electric conductivity without disruption. The sponge spiral wounded tube can be further enhanced by having a metal wire in the center (FIG. 3A). The metal can be copper, aluminum, steel or other alloys. The metal wire provides tensile strength to the spiral tube and resists breakage and other damages, although it adds slightly more weight to the tube. The sponge tubes can be wrapped around by an insulating outer layer to make it an electrical wire (FIGS. 3B and 3C). It is more flexible and durable against breakage/cracks, while maintaining continuity to conduct electric power. It is lightweight and highly conductive and can serve as an alternative to copper/aluminum wire/cable. Additionally, the graphene sponge hollow spiral tube coated with a protective outer layer can be an efficient heat exchanger. For example, a gas or liquid fluid can flow through the tube and carry the heat in/out of the surrounding environment.

Figures 4A, 4B, 4C:
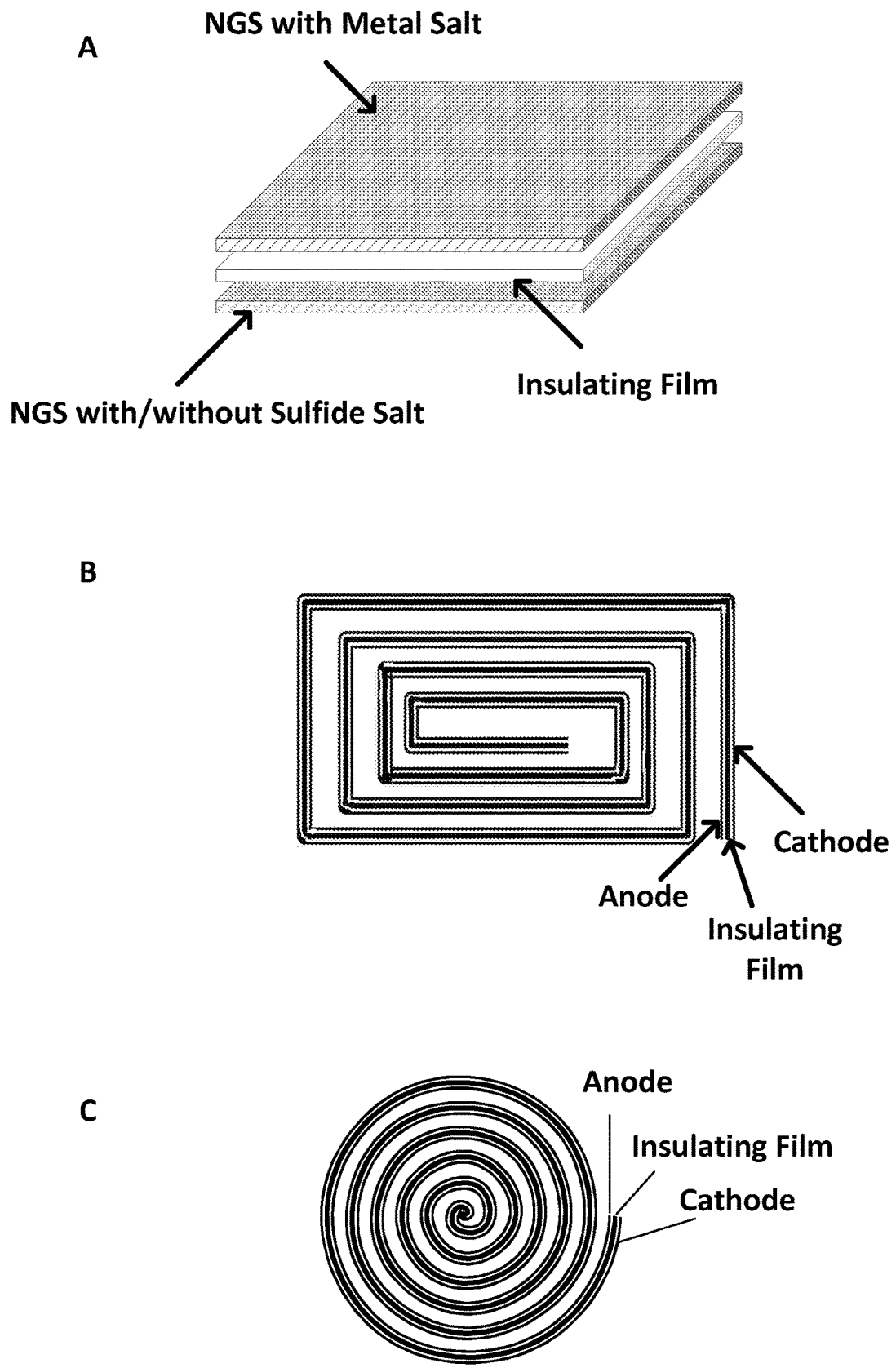
FIGS. 4A, 4B, and 4C (collectively "FIG. 4") show examples of an electrode assembly containing an NGS.

A metal-containing NGS sheet/film according to FIG. 4 can be paired with another NGS sheet/film, separated by an insulating film, then folded one or multiple times and filled with a transport liquid medium to form a compacted size rechargeable battery with a high density of charging capacity and fast charging speed. The graphene and graphite are highly conductive, thus they do not require aluminum or copper foil as the conductors for anode and cathode (FIG. 4). In the anode, the open cells hold a large quantity of metal ions. The high level of graphene content ensures good electric contact with metal ions. Hence metal ions can be charged and discharged. In the cathode, the open cells have a huge contacting surface for metal ions to be held in graphite in the cells. The open cells provide large space to accommodate the metal ions expansion and contraction during the charging and discharging stage. Moreover, the open cells allow metal ions retained within the cells without causing the outgrowth of dendrites, thus prolonging the useful life of the rechargeable battery (FIG. 5).

1.1. Graphene Batteries and Supercapacitors

Because of the high conductivity of the interconnected networks, the 3D porous structure, high electrochemical stability, and high elasticity and mechanical stability, NGS is an attractive material for applications in the fields of energy storage and conversion, including batteries, supercapacitors, fuel cells, and solar cells. The present disclosure provides a product including the above-described NGS. The product may be a battery (e.g., graphene battery, Li-ion battery, graphene-lithium-sulfur batteries) or a capacitor (e.g., supercapacitor) or a part thereof. For example, the NGS may be used to form an electrode (e.g., anode, cathode). In some embodiments, the present disclosure further provides an NGS-containing rechargeable battery that may be used for common everyday items, such as mobile devices, electric vehicles (EVs), hybrid electric vehicles (HEVs) or in smart energy systems. NGS-containing rechargeable batteries allow for faster cycle times and increased electrode density. They also have the ability to retain the charge longer, improving the lifespan of the battery.

The rechargeable battery is composed of an anode, a cathode, one or more insulating layers, and a conductive medium. The conductive medium may be an electrolyte comprising an organic solvent and a salt of the alkali metal in contact with the anode and the cathode. The anode may be intercalated with an alkali metal, which may be encapsulated in the open cells and in contact with the graphene/graphite walls.

The anode may be made of a sponge-like sheet/film (e.g., NGS sheet/film), as described above. For example, the anode may be made of the NGS sheet/film containing graphene/graphite/carbon particles/residual resin/metal salt. The NGS sheet/film has an open cell structure and is highly conductive. The cell size ranges from nanometer size to millimeter size. The cell walls consist of a mixture of graphene/graphite/residual resin whereas the graphene provides the structure of the sponge and the resin enhances its flexibility. The NGS sheet/film can be covered by an insulating layer coating/cover. It can then be folded with an opposing NGS sheet/film to form cathode and anode. A conductive medium is introduced to fill all the open cells in the NGS. This assembly constitutes a rechargeable battery. During charging or discharging, the metal ion (e.g., lithium, sulfur, sodium) travels through the insulating coating between the cathode and anode, and the energy is stored or discharged. In this NGS battery configuration, there is no need for copper or aluminum as a conductor. As a result, the weight of the battery is significantly lighter. Such pure NGS electrodes are possible, also because of the outstanding mechanic robustness of NGS. This graphene sponge structure has a large contact surface area with the metal salts so that more salt can be accommodated in a specific volume, leading to a higher power density. In addition, graphene/graphite are highly conductive materials so that it can handle high current charge and discharge. This reduces the charging time for the rechargeable battery. Further, because the metal salt is encapsulated in the open cells, the hollowed space in the cell can accommodate the expansion and shrinkage of the metal salt. Thus, the NGS batteries can contain the growth of the destructive dendrites and extend the battery life. The application of NGS in batteries will be further described in the following sections.

For lithium-sulfur batteries, using graphene as a support material for sulfur ions eliminates some of the associated problems in sulfur batteries, thanks to its unique properties, such as a large surface area, high chemical/thermal stability, good mechanical strength, and high electrical conductivity. The high surface area provides a good dispersion of sulfur, which controls the mobilization of sulfur ions and eliminates a build-up of sulfur ions on the cathode. The one-pot synthesis described in this disclosure can also be used to produce graphene supported sulfur particles.

Figure 5A:
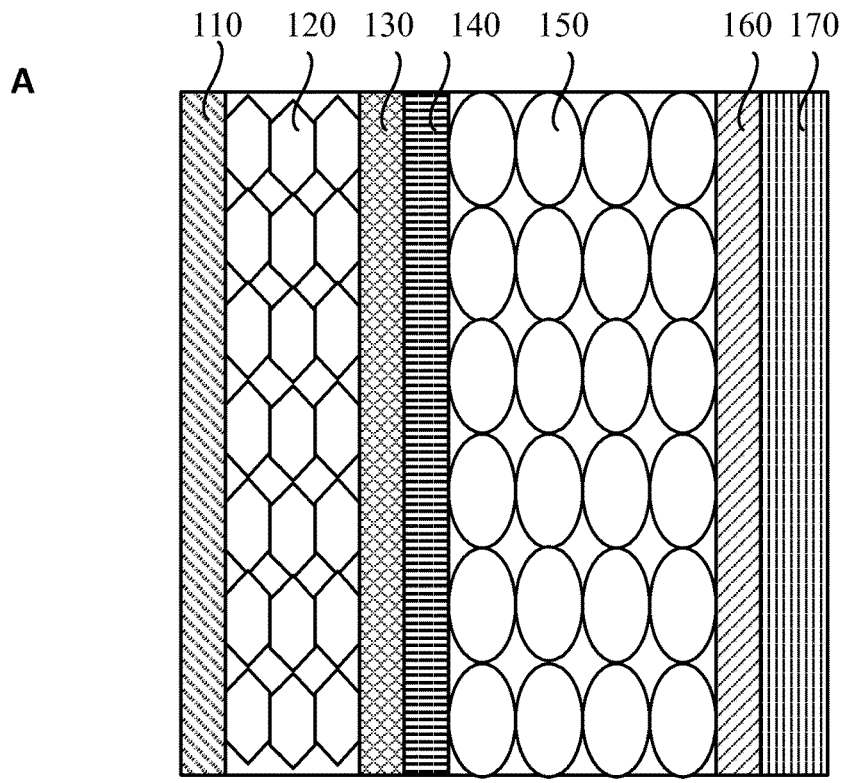
FIGS. 5A and 5B (collectively "FIG. 5") show an example of a sandwich assembly used in a Li-ion battery (LIB) (FIG. 5A) and an example of a prismatic cell (FIG. 5B).

NGS-containing batteries are available in many forms. FIG. 5A shows an example of an NGS-containing rechargeable battery. To form a rechargeable cell, the anode is combined with other elements to form a layered or "sandwich" structure as generally shown in FIG. 5A. Thus NGS sponge anode 120, is assembled with an electrochemically active cathode or counter electrode 150 capable of reversibly incorporating lithium. Counter electrode 150 may incorporate a particulate material which is lithium-intercalable or otherwise capable of reversibly reacting with lithium. The particulate material is disposed of on a sheet-like electrically conductive cathode current collector 160. The particulate, lithium-intercalable cathode material may be a transition metal chalcogenide. Preferred compositions include conventional Li-ion battery (LIB) cathode materials, such as molybdenum sulfides, vanadium oxides, manganese oxides, and the like. The particulate cathode material may be distributed on sheet-like current collector 160 by a slurrying and coating process conventional to LIB. A sheet-like porous, electrically insulating separator 140, which may be a microporous polypropylene or a polymeric mesh, is interposed between anode 120 and cathode 150.

Figure 5B:
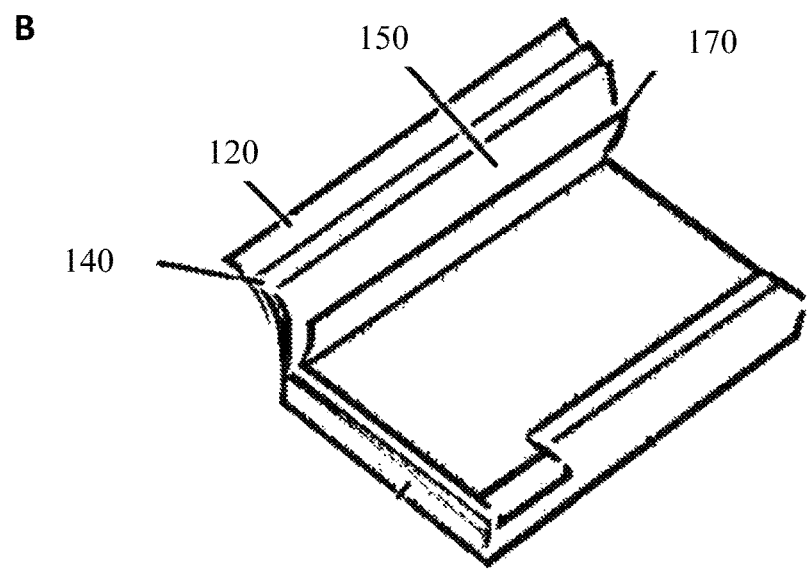

In some configurations, a sheet of lithium metal 130 is placed between anode 120 and separator 140 so that the lithium sheet lies adjacent to, and in contact with, the anode 120. The size of the lithium metal sheet 130 may be chosen so that the surface of the sheet is co-extensive with the surface of the anode 120, and the thickness of the sheet 130 is chosen so that the correct amount of lithium is present for the intercalation reaction as discussed below. Sandwich structure 100 may further include an additional separator 170 disposed on cathode current collector 160. This sandwich structure may be used to construct various battery configurations (e.g., spiral/cylindrical cell, prismatic cell, pouch cell, button cell). An example of a prismatic cell is shown in FIG. 5B.

An electrolyte, preferably including a lithium salt or other lithium-containing compound dispersed in a suitable organic solvent and compatible with both the cathode and anode materials, is used in the cell. The electrolyte solvent capable of wetting the separators and particulate materials is desirable. The electrolyte solvent may include ester solvents, e.g., propylene carbonate (PC), ethylene carbonate (EC), or mixtures thereof. Examples of other solvents that may be used, include, without limitation, 2-methyl tetrahydrofuran (2-MTHF), tetrahydrofuran, sulfolane, dimethyl sulfite, monoglyme (1,2-dimethoxyethane), diglyme, triglyme, tetraglyme, p-dioxane, 1,3-dioxane, dimethoxymethane, diethyl ether, and trimethoxyethane. Suitable electrolyte salts may include, without limitation, $LiAsF_6$, $LiPF_6$, $LiClO_4$, $LiBF_4$, $LiB(C_6H_5)_4$, $LiCF_3F$, $LiAlCl_4$, LiBr, and mixtures thereof.

The addition of the electrolyte to the cell causes the lithium metal in sheet 130 to intercalate into the carbonaceous composition of anode 120, as the lithium metal has a higher electrochemical potential than the anode. In effect, anode 120 and the lithium sheet 130 constitute a temporary cell having a carbonaceous electrode and a lithium electrode. Because sheet 130 is electrically and physically connected to anode 120, this temporary cell is short-circuited. As a result, the temporary cell discharges, causing lithium to pass from the high-potential electrode (sheet 130) to the lower potential electrode (anode 120). Such an initial lithiation process can be conducted at about room temperature (20° C.) or below. The initial lithiation process continues until the lithium metal in sheet 130 is totally consumed by the carbon of anode 120 in the formation of $Li_xC_6$, or until the anode 120 becomes saturated with lithium, whichever occurs first.

In addition to rechargeable batteries, NGS can also be used to fabricate graphene supercapacitors (e.g., double-layer capacitors, pseudo-capacitors). Supercapacitors are a useful electrochemical energy storage device typically used as a sustainable power supply (such as electric vehicles and mobile electronic devices) due to their higher power density than batteries, higher energy density than conventional dielectric capacitors, and long life cycles. Supercapacitors store energy by building up charges at the electrode-electrolyte interface through polarization. Activated carbon has been traditionally used as the electrode material, but the inability to work at high voltages is its major disadvantage. Graphene and its derivatives are useful due to their open-pore structure, high conductivity, high specific surface area, production potential, and low cost; all of which are desirable attributes for a supercapacitor. However, graphene sheets, unless well separated from each other, tend to form irreversible agglomerates through strong π-π stacking and van der Waals interaction. Meanwhile, the electrochemical binders and additives are normally required to make graphene-based electrodes, which would have an adverse effect on the specific capacitance of the resulting electrodes. Due to these challenges faced by the 2D graphene, 3D porous NGS with high electrical conductivity and large specific surface area, short diffusion pathways for electrolyte ions and fast transport channels for electrons are ideal supercapacitor materials.

NGS can also be employed in fuel cells and used either as catalysts or catalyst carrier supporting metals and alloys in oxidation. Compared to 2D graphene sheets, NGS possess a greater active surface area for electron/ion transport. The uniformity of the graphene surface in NGS also eliminates aggregation, promoting an even distribution of the platinum particles across the supports. NGS can be doped with nitrogen after subjecting it to a nitrogen plasma treatment. Doped NGS possesses nitrogen-based functional groups on its surface, which enable a better dispersion and decoration by the platinum nanoparticles. Doping NGS with nitrogen will allow for a greater conductivity and electrocatalytic activity.

1.2. Other Applications 1.2.1. Catalysts and Catalyst Supports

NGS can be used as graphene-based catalysts. It may be used in organic synthesis, sensors, environmental protection, and energy-related systems. NGS overcomes the shortcomings associated with the conventional graphene-based catalysts, for example, the large resistance from structural defects and the strong planar stacking of graphene sheets lead to a drastic deterioration of the properties. The 3D porous interconnected network of NGS is beneficial for ion diffusion and transfer kinetics, and provides a special reaction microenvironment and conductively multiplexed pathways for rapid charge transfer and conduction. NGS is ideal for use as either metal-free catalysts or robust matrices for accommodating metals, metal oxides and catalyst precursors for applications in many catalytic systems.

NGS can be used as catalyst supports. The 3D porous structures of the NGS facilitate the mass transfer and maximize the accessibility to the catalyst surfaces. Thus, NGS is well-suited to support catalyst active materials. The ease of catalyst separation, high turnover, low catalyst loading, and recyclability could potentially render NGS applicable to industrial settings.

1.2.2. Sensors and Biology Applications

Owing to their low-mass densities, large surface areas, good mechanical stabilities, and high electrical conductivities, NGS can be employed in biosensors and gas-sensing devices. The 3D structures NGS are also suitable for accommodating drugs, biomolecules, bacteria or even cells to resemble an in vivo 3D environment. For example, NGS can be used as nanocarriers for the delivery of therapeutic agents, such as anti-cancer drugs.

2. Preparation of Nano-Graphitic Sponge (NGS)

Figure 6:
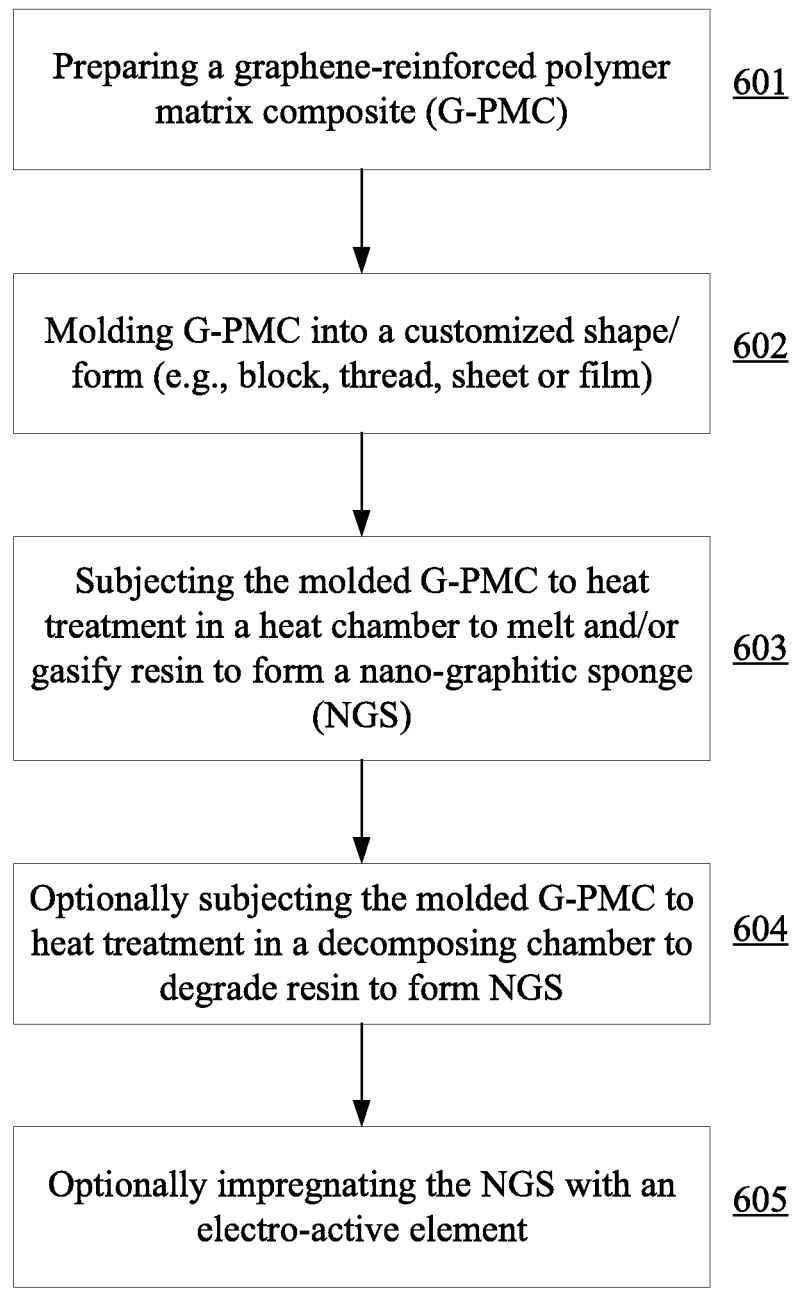
FIG. 6 shows an example process of fabricating an NGS.

Although some methods have been described, preparing highly ordered graphene-based materials, such as NGS, is still very challenging. Thus, one of the objects of this disclosure is to provide methods for fabricating the above-described NGS from a graphene-reinforced polymer matrix composite (G-PMC). Referring now to FIG. 6, G-PMC is prepared by polymer processing methods comprising in situ exfoliation of well-crystallized graphite particles dispersed in a molten thermoplastic polymer matrix at (601). From the graphene-reinforced polymer matrix composite, a molded shape may be formed using a typical plastic molding process (at 602). The shaped part is then placed in an oven in a "soft mold" of sand or other ceramic particulate, and heated slowly in an oven until the polymer degrades and gasifies (at 603). For example, the heating temperature may be raised to at or near the Tg (gasification temperature) of the polymer for a period of time sufficient to gasify or degrade the polymer (e.g., 20 hours). The heating process may be performed in a high-pressure environment or a low-pressure environment (e.g., vacuum). In some embodiments, the heating process may also be performed in an inert gas atmosphere. For example, the graphene-reinforced polymer matrix composite may be heated in an oven chamber filled with nitrogen or argon gas. In some embodiments, prior to raising the temperature to Tg, the heating temperature may be raised to at or near the Tm (melting temperature) of the polymer for a period of time (e.g., 20 hours). In one example, the graphene-reinforced PA 6-6 polymer matrix composite was heated first at about 62° C. for about 20 hours, followed by heating at about 262° C. for about 20 hours. In another example, the graphene-reinforced PEEK polymer matrix composite was heated first at about 200° C. for about 20 hours, followed by heating at about 280° C. for about 20 hours. The resulting G-PMC is transformed into an NGS by heating the composite until the polymer liquefies and gasifies at a temperature and for a duration of time sufficient to degrade and gasify the polymer in a controlled atmosphere (at 604). In some situations, to prepare the NGS for use in electrodes, the composition of the NGS is further modified by vapor- or liquid-infiltration of electro-active elements using metalorganic- or inorganic-precursors (at 605).

The polymer, and potential additives, used as the medium to perform the exfoliation in situ may leave behind materials that will be useful in terms of attaching lithium, or other ions, like silicon, sodium, or sulfur. Examples of polymers containing these atoms include, but are not limited to polydimethylsiloxane, polyphenylene sulfide, and sodium polyacrylate. Powders of silica, sodium-containing powders, or sulfur may be added prior to exfoliating the graphite, or just before a final stage of mixing the polymer-graphitic composite.

The sponge has a huge interior surface area to contact with the electrolyte, allowing a high current draw. The sponge itself has an open cell shape, with a limited size of dendrite volumes attainable, yet can possess a large volume. The mechanical properties of graphene provide a nanocarbon sponge that suppresses volume-change-induced disintegration of electrodes during charge/discharge cycling, and the growth of large dendrites, thereby increasing the lifetime of high-performance LIBs.

In one aspect, the present disclosure provides a method for forming a nano-graphitic sponge. The method includes (a) distributing graphite microparticles into a molten thermoplastic polymer phase; (b) applying a succession of shear strain events to the molten polymer phase so that the molten polymer phase exfoliates the graphite successively with each event until at least 1 wt %, optionally at least 5 wt %, optionally at least 10 wt %, optionally at least 20 wt %, optionally at least 50 wt %, optionally at least 75 wt %, optionally at least 95 wt % of the graphite is exfoliated to form a distribution in the molten polymer phase of single- and multi-layer graphene nanoparticles less than 50 nm thick along a c-axis direction, thereby forming a graphene-reinforced polymer matrix composite; and (c) heating the graphene-reinforced polymer matrix composite until the polymer degrades and gasifies to form a nano-graphitic sponge. In some embodiments, the method further includes (d) vapor- or liquid-infiltrating a precursor containing the electro-active element into the nano-graphitic sponge to form an electro-active element-intercalated nano-graphitic sponge.

In some embodiments, the method further includes forming a uniform distribution of one or more additives in the molten polymer phase. The additives facilitate intercalation of the electro-active element into the nano-graphitic sponge. The additives may be added prior to exfoliating the graphite, or just before a final stage of mixing the polymer-graphitic composite Examples of additives may include, without limitation, titanium, sulfur, silica and silicates, phosphorous, lithium, and aluminum-based silicates.

3. Preparation of Graphene-Reinforced Polymer Matrix (G-PMC)

This disclosure describes a high-efficiency mixing method to transform a polymer composite that contains well-crystallized graphite particles into nano-dispersed single or multi-layer graphene particles from which the NGS is formed. The method involves in situ exfoliation of the graphite layers by compounding in a batch mixer or extruder that impart repetitive, high shear strain rates. In both processes, longer mixing times provide enhanced exfoliation of the graphite into graphene nanoparticles within the polymer matrix composite (PMC). In addition, additives may be used to promote sufficient graphene/polymer bonding, thereby yielding a graphene-reinforced polymer matrix composite (G-PMC). The method is low cost to produce a G-PMC that offers numerous property advantages, including increased specific stiffness and strength, enhanced electrical/thermal conductivity, and retention of optical transparency.

Repeated compounding during a batch mixing process or single screw extrusion is used to progressively transform the initial graphite-particle dispersion into a uniform nanodispersion of discrete graphene nanoparticles. In some cases, inert gas or vacuum may be used during processing. The method is described herein as "mechanical" exfoliation to distinguish it from "chemical" exfoliation, which is the primary thrust of much of today's research. An advantage of the mechanical method is that contamination-free graphene-polymer interfaces are formed during high-shear mixing, thus ensuring good interface adhesion or bonding. Other advantages of in situ exfoliation are that it avoids making and handling graphene flakes, as well as dispersing them uniformly in the polymer matrix phase.

Depending on the number of in situ shear strain events, the method provides multi-layer graphene, graphene flakes, graphene platelets, few-layer graphene or single-layer graphene in a pure and uncontaminated form. Platelets have diamond-like stiffness and are used for polymer reinforcement. Graphene in any form increases polymer toughness by inhibiting crack propagation as a reinforcement for polymers. Graphene may be used as an additive to polymers and other compositions to provide electrical and thermal conductivity. The thermal conductivity of graphene makes it a desirable additive for thermal management for electronic devices and lasers.

The graphene may be produced as a graphene-polymer mixture suitable for use as-is as a G-PMC that can be pelletized by conventional means for subsequent fabrication processing. Alternatively, higher concentrations of graphite may be used at the outset to provide a graphene-polymer masterbatch in a concentrated form that can also be pelletized and then used to add graphene to polymer compositions as a reinforcing agent. As a further alternative, the graphene may be separated from the polymer, for example, by combustion or selective dissolution, to provide essentially pure particles of graphene.

The availability of graphite-rich mineral deposits, containing relatively high concentrations (e.g., about 20%) of well-crystallized graphite, makes for a low cost and virtually inexhaustible source of raw material. As discussed below, the extraction of graphite particles from the mined material can be accomplished cost-effectively. Synthetic graphite of high purity and exceptional crystallinity (e.g., pyrolytic graphite) may also be used for the same purpose. However, in this case, the batch mixing or extrusion compounding-induced exfoliation process creates a laminated composite, in which the graphene nanoparticles are oriented over a relatively large area. Such laminated composites may be preferred for specific applications.

Mechanical exfoliation of graphite within a polymer matrix may be accomplished by a polymer processing technique that imparts repetitive high shear strain events to mechanically exfoliate graphite microparticles into multi- or single-layer graphene nanoparticles within the polymer matrix.

A succession of shear strain events is defined as subjecting the molten polymer to an alternating series of higher and lower shear strain rates over essentially the same time intervals so that a pulsating series of higher and lower shear forces associated with the shear strain rate are applied to the graphite particles in the molten polymer. Higher and lower shear strain rates are defined as a first higher, shear strain rate that is at least twice the magnitude of a second lower shear strain rate. The first shear strain rate will range between 100 and 10,000 sec$^{-1}$. At least 1,000 to over 10,000,000 alternating pulses of higher and lower shear strain pulses are applied to the molten polymer to form the exfoliated graphene nanoparticles. The number of alternating pulses required to exfoliate graphite particles into graphene particles may be dependent on the original graphite particle dimensions at the beginning of this process, i.e., smaller original graphite particles may need a lower number of alternating pulses to achieve graphene than larger original graphite particles. This can be readily determined by one of ordinary skill in the art guided by the present specification without undue experimentation.

In some embodiments, the method includes applying a succession of shear strain events to generate a shear rate less than or equal to 1000 sec-1 (e.g., 1000 sec-1, 900 sec-1, 800 sec-1, 700 sec-1, 600 sec-1, 500 sec-1, 400 sec-1, 300 sec-1, 200 sec-1, 100 sec-1, 50 sec-1).

After high-shear mixing, the graphene flakes are uniformly dispersed in the molten polymer, are randomly oriented, and have a high aspect ratio. The orientation of the graphene may be achieved by many different methods. Conventional drawing, rolling, and extrusion methods may be used to directionally align the graphene within the PMC fiber, filament, ribbon, sheet, or any other long-aspect shape. The method to fabricate and characterize a G-PMC is comprised of four main steps including:

1. Extraction of crystalline graphite particles from a mineral source;
2. Incorporation of the extracted graphite particles into a polymer matrix phase and conversion of the graphite-containing polymer into a graphene-reinforced polymer matrix composite (G-PMC) by a high-efficiency mixing/exfoliation process;
3. Morphology analysis to determine the extent of mechanical exfoliation and distribution of multi-layer graphene and graphene nanoparticles; and
4. X-ray diffraction analysis to determine multi-layer graphene or graphene crystal size as a function of mechanical exfoliation.

Highly crystalline graphite may be extracted from graphite ore by a multi-step process, as described below.

1. Crushing: A drilled rod of graphite ore from the mine may be placed in a vice and crushed.
2. Grinding: The crushed graphite ore may then be ground by mortar and pestle.
3. Size Reduction: The ground graphite ore may be placed in a sieve with a 1-mm mesh size and size reduced.

Larger pieces that do not pass through the screen may be ground by mortar and pestle and then size reduced through the 1-mm mesh size again. Eventually, all of the material passed through the 1-mm mesh size to obtain graphite ore powder.

4. Density Separation by Water: The 1-mm sized powder may be placed in a column filled with water and agitated until a clear separation formed between the more dense portions of the solids and the less dense portions. Graphite is near the density of water (1 g/cm$^3$), while silicon is much more dense (2.33 g/cm$^3$). The uppermost materials are siphoned off with the water and then dried. The dried powder graphite is referred to as Separated Mineral Graphite (SMG).

In commercial practice, very large crushing and grinding machines are available to produce tonnage quantities of mixed powders, from which the graphite component can be separated by standard floatation methods.

Thus, an in situ exfoliation method of fabricating a G-PMC is provided. In this method, a polymer that is uniformly blended with micron-sized crystalline graphite particles is subjected to repeated compounding-element processing during batch mixing or extrusion at a temperature where the polymer adheres to the graphite particles. Typical polymers have a heat viscosity (without graphite) greater than 100 cps at the compounding temperature. The compounding temperature will vary with the polymer and can range between room temperature (for polymers that are molten at room temperature) and 600° C. Typical compounding temperatures will range between 180° C. and 400° C.

In one embodiment, the extrusion compounding elements are as described in U.S. Pat. No. 6,962,431, the disclosure of which is incorporated herein by reference, with compounding sections, known as axial fluted extensional mixing elements or spiral fluted extensional mixing elements. The compounding sections act to elongate the flow of the polymer and graphite, followed by repeated folding and stretching of the material. This results in superior distributive mixing, which in turn, causes progressive exfoliation of the graphite particles into discrete graphene nanoparticles. Batch mixers may also be equipped with equivalent mixing elements. In some embodiments, a standard-type injection molding machine is modified to replace the standard screw with a compounding screw for the purpose of compounding materials as the composition is injection molded. Such a device is disclosed in US 2013/0072627, the entire disclosure of which is incorporated herein by reference.

Thus, the effect of each compounding pass is to shear-off graphene layers one after the other, such that the original graphite particles are gradually transformed into a very large number of graphene nanoparticles. After an appropriate number of such passes, the final result is a uniform dispersion of discrete graphene nanoparticles in the polymer matrix phase. Longer mixing times or a higher number of passes through the compounding elements provide smaller graphite crystal size and enhanced exfoliation of graphite into graphene nanoparticles within the polymer matrix; however, the shear events should not be of a duration that would degrade the polymer.

As the content of graphene nanoparticles increases during multi-pass extrusion, the viscosity of the polymer matrix increases due to the influence of the growing number of polymer/graphene interfaces. To ensure continued refinement of the composite structure, the extrusion parameters are adjusted to compensate for the higher viscosity of the composite.

Automated extrusion systems are available to subject the composite material to as many passes as desired, with mixing elements as described in U.S. Pat. No. 6,962,431, and equipped with a re-circulating stream to direct the flow back to the extruder input. Since processing of the graphene-reinforced PMC is direct and involves no handling of graphene particles, fabrication costs are low.

In order to mechanically exfoliate graphite into multi-layer graphene and/or single-layer graphene, the shear strain rate generated in the polymer during processing must cause shear stress in the graphite particles greater than the critical stress required to separate two layers of graphite, or the interlayer shear strength (ISS). The shear strain rate within the polymer is controlled by the type of polymer and the processing parameters, including the geometry of the mixer, processing temperature, and speed in revolutions per minute (RPM).

The required processing temperature and speed (RPM) for a particular polymer is determinable from polymer rheology data given that, at a constant temperature, the shear strain rate (γ&) is linearly dependent upon RPM, as shown by Equation 1. The geometry of the mixer appears as the rotor radius, r, and the space between the rotor and the barrel, Δr.

$$\gamma\& = \left(\frac{2\pi r}{\Delta r}\right)\left(\frac{RPM}{60}\right) \qquad \text{Equation 1}$$

Polymer rheology data collected for a particular polymer at three different temperatures provide a log shear stress versus log shear strain rate graph. The ISS of graphite ranges between 0.2 MPa and 7 GPa, but a new method has quantified the ISS at 0.14 GPa. Thus, to mechanically exfoliate graphite in a polymer matrix during processing, the required processing temperature, shear strain rate and RPM is determinable for a particular polymer from a graph of log shear stress versus the log shear strain rate, collected for a polymer at a constant temperature, so that shear stress within the polymer is equal to or greater than the ISS of graphite. Under typical processing conditions, polymers have sufficient surface energy to behave like the sticky side of adhesive tape, and thus are able to share the shear stress between the polymer melt and the graphite particles.

The G-PMC from which the NGS is formed, is formed in turn by distributing graphite microparticles into a molten thermoplastic polymer phase and applying a succession of shear strain events to the molten polymer phase so that the molten polymer phase exfoliates the graphite successively with each event until at least 1 wt %, optionally at least 5 wt %, optionally at least 10 wt %, optionally at least 20 wt %, optionally at least 50 wt %, optionally at least 75 wt %, optionally at least 95 wt % of the graphite is exfoliated to form a distribution in the molten polymer phase of single- and multi-layer graphene nanoparticles less than 50 nm thick along a c-axis direction. In some embodiments, the succession of shear strain events may be applied until at least 50 wt % of the graphite is exfoliated to form a distribution in the molten polymer phase of single- and multi-layer graphene nanoparticles less than 50 nm thick along the c-axis direction. In some embodiments, the succession of shear strain events may be applied until at least 75 wt % of the graphite is exfoliated to form a distribution in the molten polymer phase of single- and multi-layer graphene nanoparticles less than 50 nm thick along the c-axis direction.

In some embodiments, the succession of shear strain events may be applied until at least 90 wt % of the graphite is exfoliated to form a distribution in the molten polymer phase of single- and multi-layer graphene nanoparticles less than 50 nm thick along the c-axis direction. In some embodiments, the succession of shear strain events may be applied until at least 50 wt % of the graphite is exfoliated to form a distribution in the molten polymer phase of single- and multi-layer graphene nanoparticles less than 10 nm thick along the c-axis direction. In some embodiments, the succession of shear strain events may be applied until at least 75 wt % of the graphite is exfoliated to form a distribution in the molten polymer phase of single- and multi-layer graphene nanoparticles less than 10 nm thick along the c-axis direction. In some embodiments, the succession of shear strain events may be applied until at least 90 wt % of the graphite is exfoliated to form a distribution in the molten polymer phase of single- and multi-layer graphene nanoparticles less than 10 nm thick along the c-axis direction.

Graphene-reinforced polymer matrix composites suitable for use with the present invention contain an essentially uniform distribution in a thermoplastic polymer matrix of between about 5 wt % and about 50 wt %, preferably about 20 wt % to about 40 wt %, more preferably about 25 wt % to about 35 wt %, and most preferably about 30 wt % to about 35 wt % of total composite weight of particles selected from the group consisting of graphite microparticles, single-layer graphene nanoparticles, multi-layer graphene nanoparticles, and combinations of two or more thereof where at least 50 wt % of the particles consist of single- and/or multi-layer graphene nanoparticles less than 50 nm thick along a c-axis direction.

According to some embodiments, the graphene-reinforced polymer matrix composite contains an essentially uniform distribution between about 1 wt % and about 50 wt % of the total composite weight of graphite and graphene particles. In some embodiments, the graphene-reinforced polymer matrix composite contains between about 4 wt % and about 40 wt % of the total composite weight of graphite and graphene particles. In some embodiments, the graphene-reinforced polymer matrix composite contains between about 6 wt % and about 30 wt % of the total composite weight of graphite and graphene particles. In some embodiments, the graphene-reinforced polymer matrix composite contains between about 8 wt % and about 20 wt % of the total composite weight of graphite and graphene particles.

Graphene-reinforced polymers according to the present disclosure typically contain between about 0.1 wt % and about 50 wt % graphene. In some embodiments, the polymers contain between about 1.0 wt % and about 30 wt % graphene. In some embodiments, about 1.0 wt % and about 10 wt % graphene. Polymer masterbatches typically contain between about 5 wt % and about 50 wt % graphene, and more typically between about 10 wt % and about 30 wt % graphene.

As defined herein, "essentially uniform" denotes that the graphene particles well-distributed throughout the molten thermoplastic polymer phase, so that individual aliquots of the composite contain the same amount of graphene within about 10 wt % of the average value, preferably within about 5 wt % of the average value, more preferably within about 1 wt % of the average value.

The thermoplastic polymers are of a type and grade sufficient to exfoliate graphene from graphite under shear strain. As previously described, examples of thermoplastic host polymers include, but are not limited to, the aforementioned polyethersulphone, polyarylate, polyphenylene ethers/oxides, polyaryletherketones, polyvinylchloride (PVC), polyetherether-ketone (PEEK), polyetherketone (PEK), polyphenylene sulfide (PPS), polyethylene sulfide (PES), polyetherimide (PEI), polyethylene terephthalate (PET), polyethylene naphthalene dicarboxylate (PEN), polyamide-imide (PAI), polyvinylidene fluoride (PVDF), polysulfone (PSU), polycarbonate (PC), aromatic thermoplastic polyesters, aromatic polysulfones, thermoplastic polyimides, thermoplastic elastomers, polyethylene, high-density polyethylene (HDPE), polypropylene, high density polyethylene, low density polyethylene, polypropylene (PP), polystyrene (PS), acrylics such as polymethylmethacrylate (PMMA), polyacrylonitriles (PAN), acrylonitrile butadiene styrene (ABS) copolymers, and the like, ultra-high-molecular-weight polyethylene (UHMWPE), polytetrafluoro-ethylene (PTFE/TEFLON®), polyamides (PA), polylactic acids (PLA), polyglycolic acid (PGA), polylactic-glycolic acid copolymers (PLGA), polyphenylene oxide (PPO), polyoxymethylene plastic (POM/Acetal), polydimethyl siloxane (PDMS), nylons, natural rubber (NR), acrylics, liquid crystal polymer (LCP), and mixtures of two or more thereof.

In some embodiments, the thermoplastic polymer is selected from the group consisting of polyamides, polystyrenes, polyphenylene sulfides, high-density polyethylenes, acrylonitrile butadiene styrene (ABS) polymers, polyacrylonitriles, polylactic acids (PLA), polyglycolic acid (PGA) and polylactic-glycolic acid copolymers (PLGA). Polyamides include aliphatic polyamides, semi-aromatic polyamides, and aromatic polyamides. Aliphatic polyamides contain no aromatic moieties. In some embodiments, the aliphatic polyamides are selected from the group consisting of polyamide-6,6 (nylon-6,6), polyamide-6 (nylon-6), polyamide-6,9; polyamide-6,10; polyamide-6,12; polyamide-4,6; polyamide-11 (nylon-11), polyamide-12 (nylon-12) and other nylons. Nylons are a well-known class of aliphatic polyamide derived from aliphatic diamines and aliphatic diacids.

Alternatively, other polyamides also classed as nylons are derived from ring-opening polymerization of a lactam, such as nylon-6 (PA-6, polycaprolactam), derived from caprolactam. In a particularly preferred embodiment, the aliphatic polyamide is polyamide-6,6, which is derived from hexamethylenediamine and adipic acid. Semi-aromatic polyamides contain a mixture of aliphatic and aromatic moieties and can be derived, for example, from an aliphatic diamine and an aromatic diacid. The semi-aromatic polyamide can be a polyphthalamide such as PA-6T, which is derived from hexamethylenediamine and terephthalic acid. Aromatic polyamides, also known as aramids, contain aromatic moieties, and can be derived, for example, from an aromatic diamine and an aromatic diacid. The aromatic polyamide can be a para-aramid such as those derived from para-phenylenediamine and terephthalic acid. A representative of the latter includes KEVLAR®.

In certain embodiments, the thermoplastic host polymer is an aromatic polymer. As defined herein the term "aromatic polymer" refers to a polymer comprising aromatic moieties, either as part of the polymer backbone or as substituents attached to the polymer backbone, optionally via a linker. Linkers include linear or branched alkylene groups, such as methylene, ethylene, and propylene, linear or branched heteroalkylene groups, such as —OCH$_2$—, —CH$_2$O—, —OCH$_2$CH$_2$—, —CH$_2$CH$_2$O—, —OCH$_2$CH$_2$CH$_2$—, —CH$_2$OCH$_2$—, —OCH(CH$_3$)—, —SCH$_2$—, —CH$_2$S—, —NRCH$_2$—, —CH$_2$NR—, and the like, where the heteroatom is selected from the groups consisting of oxygen, nitrogen, and sulfur, and R is selected from hydrogen and lower alkyl. Linkers can also be heteroatomic, such as —O—, —NR— and —S—. When the linkers contain sulfur, the sulfur atom is optionally oxidized. The aromatic moieties are selected from monocyclic, e.g., phenyl, and polycyclic moieties, e.g., indole naphthyl, anthracene, etc., and are optionally substituted with amino, NHR, $NR_2$, halogen, nitro, cyano, alkylthio, alkoxy, alkyl, haloalkyl, $CO_2R$ where R is defined as above, and combinations of two or more thereof. The aromatic moieties can also be heteroaryl, comprising one to three heteroatoms selected from the group consisting of oxygen, nitrogen, and sulfur, and optionally substituted as described above. The aromatic polymer preferably comprises phenyl groups, optionally substituted as disclosed above, either as part of the polymer backbone or as substituents on the backbone, the latter optionally through a linker, as disclosed above. In certain embodiments, the optionally substituted phenyl groups are contained within the polymer backbone as optionally substituted phenylene groups. In certain other embodiments, the optionally substituted phenyl groups are substituents on the polymer backbone, optionally connected through a linker, as described above.

In one embodiment of the graphene-reinforced polymer matrix composites as disclosed above, the graphite may be doped with other elements to modify a surface chemistry of the exfoliated graphene nanoparticles. Preferably the graphite is expanded graphite. Specifically and preferably, a surface chemistry or nanostructure of the dispersed graphite may be modified to bond with the polymer matrix to increase strength and stiffness of the graphene-reinforced composite. In one embodiment, directional alignment of the graphene nanoparticles is used to obtain one-, two- or three-dimensional reinforcement of the polymer matrix phase. In one embodiment the polymer chains are inter-molecularly cross-linked by single- or multi-layer graphene sheets having carbon atoms with reactive bonding sites on the edges of said sheets.

In one aspect of the disclosure, the above graphene-reinforced polymer matrix composite further comprises at least one additive selected from fillers, dyes, pigments, mold release agents, processing aids, carbon fiber, compounds that improve electrical conductivity, and compounds that improve thermal conductivity.

In one embodiment the graphite particles are prepared by crushing and grinding a graphite-containing mineral to millimeter-sized dimensions, reducing the millimeter-sized particles to micron-sized dimensions, and extracting micron-sized graphite particles from the graphite-containing mineral. In one embodiment the graphite particles are distributed into the molten polymer phase using a single screw extruder with axial fluted extensional mixing elements or spiral fluted extensional mixing elements. In one embodiment the graphite-containing molten polymer phase is subjected to repeated extrusion to induce exfoliation of the graphitic material and form the essentially uniform dispersion of the single- and multi-layer graphene nanoparticles in the thermoplastic polymer matrix.

In some embodiments, a cross-linked G-PMC is formed by a method including distributing graphite microparticles into a molten thermoplastic polymer phase comprising one or more molten thermoplastic polymers. A succession of shear strain events is then applied to the molten polymer phase so that the molten polymer phase exfoliates the graphene successively with each event until a lower level of graphene layer thickness is achieved, after which point ripping and tearing of exfoliated multilayer graphene sheets occurs and produces reactive edges on the multilayer sheets that react with and cross-link the thermoplastic polymer.

Thus, activated graphene is formed as the graphene fractures across the basal plane and offers potential sites for cross-linking to the matrix or attaching other chemically unstable groups for functionalization. Therefore, the cross-linking is performed under exclusion of oxygen, preferably under an inert atmosphere or a vacuum, so that the reactive edges do not oxidize or otherwise become unreactive. Forming covalent bonds between graphene and the matrix significantly increases the composite strength. Polymers that cross-link include polymers subject to degradation by ultraviolet (UV) light. This includes polymers containing aromatic, e.g., benzene rings, such as polystyrene, polymers containing tertiary carbons, such as polypropylene and the like, polymers containing backbone oxygens, such as poly (alkylene oxides), and the like.

In some embodiments, the cross-linked G-PMC can be ground into particles and blended with non-cross-linked host polymers to serve as toughening agents for the host polymer. The non-cross-linked polymer acquires the properties of the cross-linked polymer because of chain entanglement between the two polymer species. The present disclosure also includes cross-linked polymers in a particulate form that can be blended with other polymers to form a high strength composite. In one embodiment, cross-linked polystyrene and polymethyl methacrylate (PMMA) particles can be used as toughening agents for host polymers. Compositions according to the present invention include host thermoplastic polymers toughened with between about 1% and about 75% by weight of the cross-linked polymer particles of the present invention. In one embodiment, the host polymers are toughened with between about 10% and about 50% by weight of the cross-linked polymer particles.

In some embodiments, the graphene-reinforced polymer matrix composite comprises graphite cross-linked with a polyamide. Preferably the polyamide is an aliphatic or a semi-aromatic polyamide. More preferably the polyamide is an aliphatic polyamide selected from the group consisting of polyamide-6,6; polyamide-6 (nylon-6); polyamide-6,9; polyamide-6,10; polyamide-6,12; polyamide-4,6; polyamide-11 (nylon-11), polyamide-12 (nylon-12) and other nylons; particularly PA-6,6 (nylon-6,6). Preferably the graphene-reinforced polymer matrix composite contains about 35% graphite prior to in situ exfoliation of graphene. A polyamide that is cross-linked in this manner will have very high specific strength properties and is suitable for automotive, aviation, nautical and aerospace uses. For example, the cross-linked polyamide can be used in engine components such as pistons, valves, camshafts, turbochargers and the like because of its high melting point and creep resistance. Forming the rotating portions of the turbine and compressor parts of a turbocharger, including the respective blades, from the cross-linked polyamide of the present invention will reduce turbocharger lag because of the resulting weight reduction.

4. Definitions

As used in this document, the singular forms "a," "an," and "the" include plural references unless the context clearly dictates otherwise. Unless defined otherwise, all technical and scientific terms used here.

As used herein, the term "and/or" means any one of the items, any combination of the items, or all of the items with which this term is associated.

The compositions of the present invention can comprise, consist essentially of, or consist of the claimed ingredients. The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, the term "graphene" refers to the name given to a single layer of carbon atoms densely packed into a benzene-ring structure. Graphene, when used alone, may refer to multilayer graphene, graphene flakes, graphene platelets, and few-layer graphene or single-layer graphene in a pure and uncontaminated form.

As used herein, graphite, the starting material from which graphene is formed, is composed of a layered planar structure in which the carbon atoms in each layer are arranged in a hexagonal lattice. The planar layers are defined as having an "a" and a "b" axis, with a "c" axis normal to the plane defined by the "a" and "b" axes. The graphene particles produced by the inventive method have an aspect ratio defined by the "a" or "b" axis distance divided by the "c" axis distance. Aspect ratio values for the inventive nanoparticles exceed 25:1 and typically range between 50:1 and 1000:1.

As used herein, graphite micro-particles are defined as graphite in which at least 50% of the graphite consists of multilayer graphite crystals ranging between 1.0 and 1000 microns thick along the c-axis of the lattice structure. Typically 75% of the graphite consists of crystals ranging between 100 and 750 microns thick. Expanded graphite may also be used. Expanded graphite is made by forcing the crystal lattice planes apart in natural flake graphite, thus expanding the graphite, for example, by immersing flake graphite in an acid bath of chromic acid, then concentrated sulfuric acid. Expanded graphite suitable for use in the present invention includes expanded graphite with opened edges at the bilayer level, such as MESOGRAF.

As used herein, the terms "nano-graphitic sponge," "NGS," "graphene sponge," and "three-dimensional graphene network," are used interchangeably.

Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates which may need to be independently confirmed.

5. Examples

Heat Treatment of Graphene Nano-Flake (GNF)-Polymer Composites

The effects of post-fabrication heat treatments on structures and properties of 35 wt. % GNF-poly(ether-ether-ketone) (PEEK) composites was investigated. The composite samples were made in a specially designed exfoliation/injection molding machine that has the ability to in-situ exfoliate 300 Mm graphite sheets in molten polymers and reduce the reinforcing material to few-layers or even single-layer graphene. The PEEK samples were prepared by the methods described in U.S. Pat. No. 10,329,391, the disclosure of which is incorporated by reference. A feature of the subsequent heat treatment is at least one extended annealing at a temperature just above the melting point of the polymer matrix phase, where reaction occurs between GNFs and polymer matrix.

35 wt. % GNF-PEEK Composite

Heat treatment of 35 wt. % GNF-PEEK samples was performed in a resistively-heated furnace, with each sample placed vertically in the furnace. The first experiments involved heating composite specimens at a rate of 5° C./min to 200° C., 400° C., and 600° C., and held at each temperature for 20 minutes. The samples heated at 400° C. and 600° C. for 20 minutes experienced extensive decomposition of the PEEK matrix phase, leaving behind porous graphitic material. In addition, the specimens showed swelling from accumulation of PEEK-decomposition gases within the samples. Most of the swelling occurred in the upper half of the specimen, as would be expected from buoyancy effects.

One-Step heat treatment of a 35 wt % GNF-PEEK sample above 380° C. (well above Tm) caused gross swelling, due to gasification of the PEEK matrix. As would be expected, decomposition of the PEEK matrix starts at the sample surface and propagates into the sample's interior, thus creating a porous preform of graphene nano-flakes. A two-step heat treatment was also used to modify the structure and properties of 35 wt. % graphite-PEEK composite. It involved heating the composite at 200° C. for 20 hours and then above 380° C. for 18 hours, after which some samples were heat-treated at 600° C. for 60 minutes.

After post-heat treatment at 600° C. for 60 minutes, decomposition of the PEEK matrix was essentially complete, leaving behind a porous-graphitic preform that displays some rigidity. The latter is attributed to the presence of some fraction of pyrolyzed PEEK (amorphous carbon) forming bridges between neighboring GNFs. Interestingly; this effect opens opportunities for subsequent infiltration of a porous-graphitic preform with reactive or non-reactive materials. The same results were obtained for a single step one hour heating of samples at 600° C.

Small samples of 35 wt % GNF-PEEK, before and after 600° C. post-heat treatment, were immersed in concentrated sulfuric acid (98%) for 24 hr. The heat-treated sample survived immersion in the acid, whereas the untreated sample did not. In fact, the latter underwent complete disintegration, forming a fine-scale suspension of GNFs in the acidic solution. This test shows that the annealing treatment introduces effective bonding between neighboring GNFs in the composite, such that upon acid etching to remove the remaining PEEK a moderately rigid porous GNF-based structure is realized. One possible mechanism is the formation of bridges of pyrolyzed carbon between neighboring GNFs in the porous structure.

All of the methods and apparatus disclosed and claimed herein can be made and executed without undue experimentation in light of the present disclosure. While the invention has been described in terms of preferred embodiments, it will be apparent to those having ordinary skill in the art that variations may be applied to the apparatus, methods, and sequence of steps of the method without departing from the concept, spirit, and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope, and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A nano-graphitic sponge, comprising particles selected from the group consisting of graphite microparticles, single-layer graphene nanoparticles, multi-layer graphene nanoparticles, and combinations of two or more thereof,
wherein the particles comprise mechanically exfoliated single- and/or multi-layer graphene nanoparticles,
wherein the nano-graphitic sponge comprises an open cell structure having a plurality of open cells,
wherein the nano-graphitic sponge comprises thermoplastic polymer chains intermolecularly crosslinked to the single- and multi-layer graphene nanoparticles through covalent bonding, and
wherein the nano-graphitic sponge comprises the thermoplastic polymer molecules that are each covalently bonded to one or more the single- and/or multi-layer graphene nanoparticles or wherein the nano-graphitic sponge comprises at least one thermoplastic polymer molecule bonded or adhered to one or more mechanically exfoliated single- or multi-layer graphene nanoparticles.

2. The nano-graphitic sponge of claim 1, wherein the single- and/or multi-layer graphene nanoparticles are less than 50 nanometers thick along the c-axis direction.

3. The nano-graphitic sponge of claim 1, wherein the particles account for at least 50% of total sponge weight.

4. The nano-graphitic sponge of claim 1, wherein the nano-graphitic sponge further comprises a thermoplastic polymer.

5. The nano-graphitic sponge of claim 4, wherein the thermoplastic polymer is selected from the group consisting of polydimethylsiloxane (PDMS), sodium polyacrylate, polymethyl-methacrylate (PMMA), acrylonitrile, acrylonitrile butadiene styrene (ABS) co-polymers, polyacrylonitriles (PAN), aromatic thermoplastic polyesters, liquid crystal polymers, polyarylether-ketones, polycarbonates (PC), polyetherether-ketones (PEEK), polyetherimides (PEI), polyetherketones (PEK), polyethylene sulfide (PES), polyethylene terephthalate (PET or PETE), low-density polyethylene (LDPE), high-density polyethylene (HDPE), polyglycolic acid (PGA), polylactic acids (PLA), polylactic-glycolic acid copolymers (PLGA), polyoxymethylene plastic (POM/Acetal), polyphenylene ethers, polyphenylene oxide (PPO), polyphenylene sulfides (PPS), polypropylene (PP), polystyrene (PS), polysulfones (PSU), polytetrafluoroethylene (PTFE/TEFLONO), polyvinylchloride (PVC), polyvinylidene fluoride (PVDF), thermoplastic elastomers, thermosplastic polyimides, ultra-highmolecular-weight polyethylene (UHMWPE), semi-aromatic polyamides, aromatic polyamides, polyamide-11 (nylon-11, polyamide-12 (nylon-12), polyamide-4,6, polyamide-6 (nylon-6), polyamide-6,10, polyamide-6,12, polyamide-6,6 (nylon-6,6), polyamide-6,9, and the mixtures of two or more thereof.

6. The nano-graphitic sponge of claim 1, wherein single- and multi-layer graphene nanoparticles are doped with other elements to modify a surface chemistry.

7. The nano-graphitic sponge of claim 1, wherein a surface chemistry or nanostructure of the exfoliated single- and multi-layer graphene nanoparticles is modified to enhance bond strength with the polymer matrix to increase strength and stiffness of the enhanced polymer matrix composite.

8. The nano-graphitic sponge of claim 1, wherein the mean pore size of the open cells ranges from about 1 nanometer to about 5 millimeters.

9. The nano-graphitic sponge of claim 1, wherein the open cells comprise an additional element encapsulated therewithin, the additional element selected from the group consisting of Li, S, Si, Na and a combination of two or more thereof.

10. The nano-graphitic sponge of claim 1, wherein the nano-graphitic sponge is formed into: a block; a thread with a diameter ranging from about 1 micrometer to about 10 millimeters; pellets with a length ranging from about 1 micrometer to about 10 millimeters; a powder form with a size ranging from about 0.1 micrometers to about 100 micrometers; or a sheet/film with a thickness ranging from about 1 micrometer to about 10 millimeters.

* * * * *